(12) United States Patent
Sekiguchi et al.

(10) Patent No.: US 7,314,275 B2
(45) Date of Patent: Jan. 1, 2008

(54) RECORDING LIQUID, LIQUID CARTRIDGE, LIQUID DISCHARGE APPARATUS AND METHOD OF LIQUID DISCHARGE

(75) Inventors: Hideki Sekiguchi, Kanagawa (JP); Yasuhiro Tanaka, Kanagawa (JP); Noriaki Furukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 62 days.

(21) Appl. No.: 10/539,490

(22) PCT Filed: Oct. 20, 2004

(86) PCT No.: PCT/JP2004/015537

§ 371 (c)(1),
(2), (4) Date: Jun. 17, 2005

(87) PCT Pub. No.: WO2005/037938

PCT Pub. Date: Apr. 28, 2005

(65) Prior Publication Data

US 2006/0055753 A1 Mar. 16, 2006

(30) Foreign Application Priority Data

Oct. 20, 2003 (JP) .............................. 2003-360027

(51) Int. Cl.
*G01D 11/00* (2006.01)

(52) U.S. Cl. .......................... 347/100; 347/95; 347/86; 523/160

(58) Field of Classification Search ................ 347/100, 347/101, 95, 96, 85, 86; 106/31.6, 31.27, 106/31.13; 523/160
See application file for complete search history.

(56) References Cited

U.S. PATENT DOCUMENTS

2005/0075421 A1 * 4/2005 Yatake ....................... 523/179

FOREIGN PATENT DOCUMENTS

| EP | 978547 A1 | * | 2/2000 |
|----|-----------|---|--------|
| JP | 10-158551 | * | 6/1998 |
| JP | 2000-272252 | | 10/2000 |
| JP | 2000-327974 | | 11/2000 |
| JP | 2000-345082 | | 12/2000 |
| JP | 2004-197037 | | 7/2004 |

* cited by examiner

*Primary Examiner*—Manish S. Shah
(74) *Attorney, Agent, or Firm*—Sonnenschein Nath & Rosenthal LLP

(57) ABSTRACT

An ink containing an ethylene oxide adduct of a dihydric alcohol, having a hydrocarbon group with 9 or less carbon atoms and having an I/O ratio ranging between 1 and 1.37, is supplied via nozzles in the form of liquid droplets onto a recording paper sheet, so that fine bubble may be suppressed from being generated in the ink to prevent emission defects such as non-emission or warped emission, and hence a high quality image free of blurring or white spots may be produced.

19 Claims, 11 Drawing Sheets

RECORDING LIQUID, LIQUID CARTRIDGE, LIQUID DISCHARGE APPARATUS AND METHOD OF LIQUID DISCHARGE

TECHNICAL FIELD

This invention relates to a recording liquid deposited on a support in the state of droplets for recording thereon, a liquid cartridge for holding the recording liquid, and to a liquid emitting device and a liquid emitting method for emitting the recording liquid, contained in the liquid cartridge, as droplets through an emitting opening onto the support.

This application claims priority of Japanese Patent Application No. 2003-360027, filed in Japan on Oct. 20, 2003, the entirety of which is incorporated by reference herein.

BACKGROUND ART

As a liquid emitting device, there is an ink jet printer apparatus in which a recording liquid, or a so-called ink, is emitted via an ink emitting head to a recording paper sheet, as a support, to record an image or a letter/character thereon. The printer apparatus of the ink jet system has advantages such as low running costs, small size, and ease in printing a colored image.

The ink jet system, emitting the ink via an ink emitting head, may be implemented by, for example, a deflection system, a cavity system, a thermo-jet system, a bubble-jet system (registered trademark), thermal ink jet system, a slit jet system, or a spark jet system. Based on these various operating principles, the ink is turned into fine liquid droplets, which are then emitted via emitting openings, that is, nozzles, of an ink emitting head, so as to be deposited on the sheet for recording an image or a letter/character thereon.

Meanwhile, a demand is raised for the nozzles not to be stopped up with the recorded liquid used in the ink jet recording system. It has so far been felt that fine bubbles in the ink represent one of the factors possibly responsible for nozzle clogging.

In the ink, a preset quantity of a gas, such as air, remains dissolved. If, with rise in temperature, the gas is lowered in solubility, the gas which may not be dissolved in the liquid is separated to form fine bubbles in the liquid. Specifically, when the ink present in an ink tank adapted for supplying the ink to e.g. an ink emitting head, in an ink duct or in an ink emitting duct rises in temperature, the gas dissolved in the liquid is released to form fine bubbles.

When these fine bubbles are present in the ink emitting head, emission troubles, such as non-emission of the ink from the nozzle or warped emission of the ink, that is, the ink being emitted from the nozzle along a path offset from the intended path, are produced, with the result that printed image suffers from white spots or becomes blurred to degrade the printing quality.

In the recording system in which the ink is turned into fine liquid droplets, under the action of thermal energy, and the so formed liquid droplets are emitted from the nozzle, that is, in the recording system of the thermal type or the bubble jet type, the ink is heated rapidly by a heater and emitted in the form of liquid droplets under the pressure of air bubbles generated by film boiling of the ink. Thus, heat is accumulated in the vicinity of the heater, and hence the ink in the ink duct is extremely liable to be raised in temperature, with the result that emission troubles, such as the aforementioned non-emission or warped emission, tend to be produced to a pronounced extent.

For combating such problem, it is proposed in e.g. the JP Patent Publications 1 and 2 to use an aqueous pigment ink doped with a propylene oxide adduct polymer of lower alcohol. However, these proposals are not up to sufficient suppression of fine bubbles and further improvement has been desired.

It has also been proposed in Patent Publication 3 to add an ethylene oxide adduct of a higher dehydrate alcohol alkoxylate in an aqueous pigment ink. The ink proposed in this Patent Publication 3 is alleged to be superior in emission stability during high frequency driving, penetrability to the recording paper sheet and in drying properties. However, if a compound obtained on adding only ethylene oxide to the higher alcohol a dihydric alcohol alkoxylate is contained in the ink, in association with the teaching by Patent Publication 1, it has not been possible to cope successfully with the problem of the nozzles being stopped with fine bubbles. Specifically, the ink obtained on adding 7 mol or more only of ethylene oxide undergoes vigorous foaming to cause severe nozzle clogging.

On the other hand, with the ink used for the ink jet recording system, a demand has been raised not only for prohibiting nozzle clogging but also for preventing the optical density from being lowered or for preventing the boundary bleeding or speckled color mixing in all-over printing, even in case of printing on a medium grade paper sheet, such as copy paper sheet or report paper sheet, or a high grade paper sheet.

For meeting the demand, it has been proposed in e.g. Patent Publication 4 to use a compound, obtained on treating a water-insoluble colorant with a high polymer material containing a sulfonic acid (sulfonate) group and/or with a high polymer material containing phosphoric acid (phosphate) group, as a colorant, and also to add a high polymer material, including a carboxylic acid (carboxylate) to the ink. It has also been proposed in Patent Publication 5 to get the ink doped with an alginic acid having a D-mannuronic acid to L-guluronic acid ratio ranging between 0.5 and 1.2. It has also been proposed in Patent Publication 6 to add at least one surfactant selected from the group of fluorine-based surfactants and silicon-based surfactants and alginates to the ink. However, neither of these Publications is sufficient to meet the aforementioned demand and further improvement has been desired.

On the other hand, the aforementioned problem, related with the bubbles, occurs more pronouncedly with a printer apparatus capable of performing high-speed printing on a recording paper sheet, that is, a line-based printer apparatus having an ink emitting range substantially equal to the width of the recording paper sheet (for example, see Patent Publications 7 to 9).

More specifically, with a line-based printer apparatus, having one or more rows of nozzles juxtaposed in a direction substantially at right angles to the width-wise direction of the recording paper sheet, as distinct from a serial-based printer apparatus in which an ink emitting head is scanned in a direction substantially at right angles to the feed direction of the recording paper sheet, an ink duct for conducting the ink from an ink tank is formed for traversing the feed direction of the recording paper sheet, and in which a plural number of ink emitting heads, each having a nozzle, are arrayed on one or both sides of the ink duct, the number of ink heating sites is correspondingly increased with the number of the nozzles, so that fine bubbles tend to be generated. Moreover, the ink tank is separated from the ink emitting head a long distance, whilst the structure from the ink tank to the ink emitting head is complicated to render it difficult to remove the fine bubbles generated, with the result that inconveniences ascribable to the fine bubbles occur most pronouncedly.

With the line-based printer apparatus, the period of emission of liquid droplets from one nozzle line to the next is that short and hence an ink exhibiting superior penetration characteristics into the recording paper sheet needs to be used. If the ink of this sort is used for a paper sheet of medium quality, the ink exhibits the tendency to seep into the paper sheet along its depth, that is, along its thickness, with the result that the optical density tends to be lowered.

In addition, if so-called color printing of emitting inks of different colors on a recording paper sheet, is to be carried out with the line-based printer apparatus, where the period of emission of liquid droplets from one nozzle line to the next is short, a color liquid droplet is deposited before the previously deposited color liquid droplet sufficiently seeps into the bulk part of the paper sheet, with the consequence that boundary bleeding or speckled color mixing in all-over printing tends to be produced between different colors.

Patent Publication 1: Japanese Laid-Open Patent publication 2001-2964
Patent Publication 2: Japanese Laid-Open Patent publication H10-46075
Patent Publication 3: Japanese Laid-Open Patent publication H7-70491
Patent Publication 4: Japanese Laid-Open Patent publication 2000-154342
Patent Publication 5: Japanese Laid-Open Patent publication H8-290656
Patent Publication 6: Japanese Laid-Open Patent publication H8-193177
Patent Publication 7: Japanese Laid-Open Patent publication 2002-36522
Patent Publication 8: Japanese Laid-Open Patent publication 2001-315385
Patent Publication 9: Japanese Laid-Open Patent publication 2001-301199

DISCLOSURE OF THE INVENTION

It is an object of the present invention to provide a recording liquid whereby the aforementioned problems of the related art may be overcome.

It is another object of the present invention to provide a recording liquid suffering from foaming only to a lesser extent, superior in emission stability, exhibiting high optical density in case of multi-color printing of an image or a letter/character on a paper sheet of a medium quality, as a support, and which is free from boundary bleeding or speckled color mixing in all-over printing to lend itself to high-quality printing, a liquid cartridge containing the recording liquid, and a method and a device capable of effecting high quality printing using the recording liquid contained in the liquid cartridge.

The present invention provides a recording liquid deposited on a support in the state of liquid droplets for recording thereon, comprising a dyestuff, a solvent for dispersing the dyestuff, and an ethylene oxide adduct of a a dihydric alcohol, containing a hydrocarbon group with 9 or less carbon atoms and having a ratio I/V of an inorganic value (IO) to an organic value (OV) not less than 1 and not larger than 1.37.

The present invention also provides a liquid cartridge mounted to a liquid supply device for operating as a supply source for the recording liquid for the liquid supply device, the liquid supply device being provided to a liquid emitting device adapted for emitting the recording liquid, held in a liquid vessel, in the form of liquid droplets, and depositing the emitted ink on a support, for effecting the recording. The recording liquid comprises a dyestuff, a solvent for dispersing the dyestuff and an ethylene oxide adduct of a dihydric alcohol, containing a hydrocarbon group with 9 or less carbon atoms and having a ratio I/V of an inorganic value (IO) to an organic value (OV) not less than 1 and not larger than 1.37.

The present invention also provides a liquid emitting device comprising emitting means including a liquid chamber for storing a recording liquid, a supply part for supplying the recording liquid to the liquid chamber, one or more pressure generating element(s) provided to the liquid chamber for thrusting the recording liquid stored in the liquid chamber, and an emitting opening for emitting the recording liquid, thrust by the pressure generating element, onto the major surface of a support from the liquid chamber as liquid droplets, and a liquid cartridge connected to the emitting means for operating as a supply source for the recording liquid. The recording liquid comprises a dyestuff, a solvent for dispersing the dyestuff and an ethylene oxide adduct of a dihydric alcohol, containing a hydrocarbon group with 9 or less carbon atoms and having a ratio I/V of an inorganic value (IO) to an organic value (OV) not less than 1 and not larger than 1.37.

The present invention also provides a liquid emitting method employing a liquid emitting device comprising emitting means including a liquid chamber for storing the recording liquid, a supply part for supplying the recording liquid to the liquid chamber, one or more pressure generating element(s) provided to the liquid chamber for thrusting the recording liquid stored in the liquid chamber, and an emitting opening for emitting the recording liquid, thrust by the pressure generating element, onto the major surface of a support from the liquid chamber as liquid droplets, and a liquid cartridge connected to the emitting means for operating as a supply source for the recording liquid. The recording liquid comprises a dyestuff, a solvent for dispersing the dyestuff and an ethylene oxide adduct of a dihydric alcohol, containing a hydrocarbon group with 9 or less carbon atoms and having a ratio I/V of an inorganic value (IO) to an organic value (OV) not less than 1 and not larger than 1.37.

Thus, according to the present invention, in which the recording liquid contains an ethylene oxide adduct of a dihydric alcohol, having a hydrocarbon group with 9 or less carbon atoms and having a ratio I/V of an inorganic value (IO) to an organic value (OV) not less than 1 and not larger than 1.37, it becomes possible to prevent fine bubbles from being generated in the recording liquid, while it also becomes possible to prevent emission defects, such as non-emission or warped emission of the recording liquid from the emitting openings. The result is that, according to the present invention, the emission defects ascribable to fine bubbles generated in the recording liquid may be prevented to eliminate blurring or generation of white spots, and that, since the recording liquid may exhibit superior wettability for the support, it is possible to achieve high quality recording of high optical density free of boundary bleeding or speckled color mixing in all-over printing.

Other objects and specified advantages of the present invention will become more apparent from the following explanation of preferred embodiments thereof especially when read in conjunction with the drawings.

BRIEF DESCRIPTION OF THE DRAWINGS

FIG. 4A is a schematic view showing the closed state of the ink supply part and FIG. 4B is a schematic view showing the opened state of the ink supply part.

FIG. 6A is a cross-sectional view with a valve in the closed state and FIG. 6B is a cross-sectional view with the valve in the opened state.

FIG. 8A is a schematic cross-sectional view showing the state in which an air bubble has been formed on a heater resistor and FIG. 8B is a schematic cross-sectional view showing the state in which the ink liquid droplet has been discharged from the nozzle.

BEST MODE FOR CARRYING OUT THE INVENTION

Figure 1:
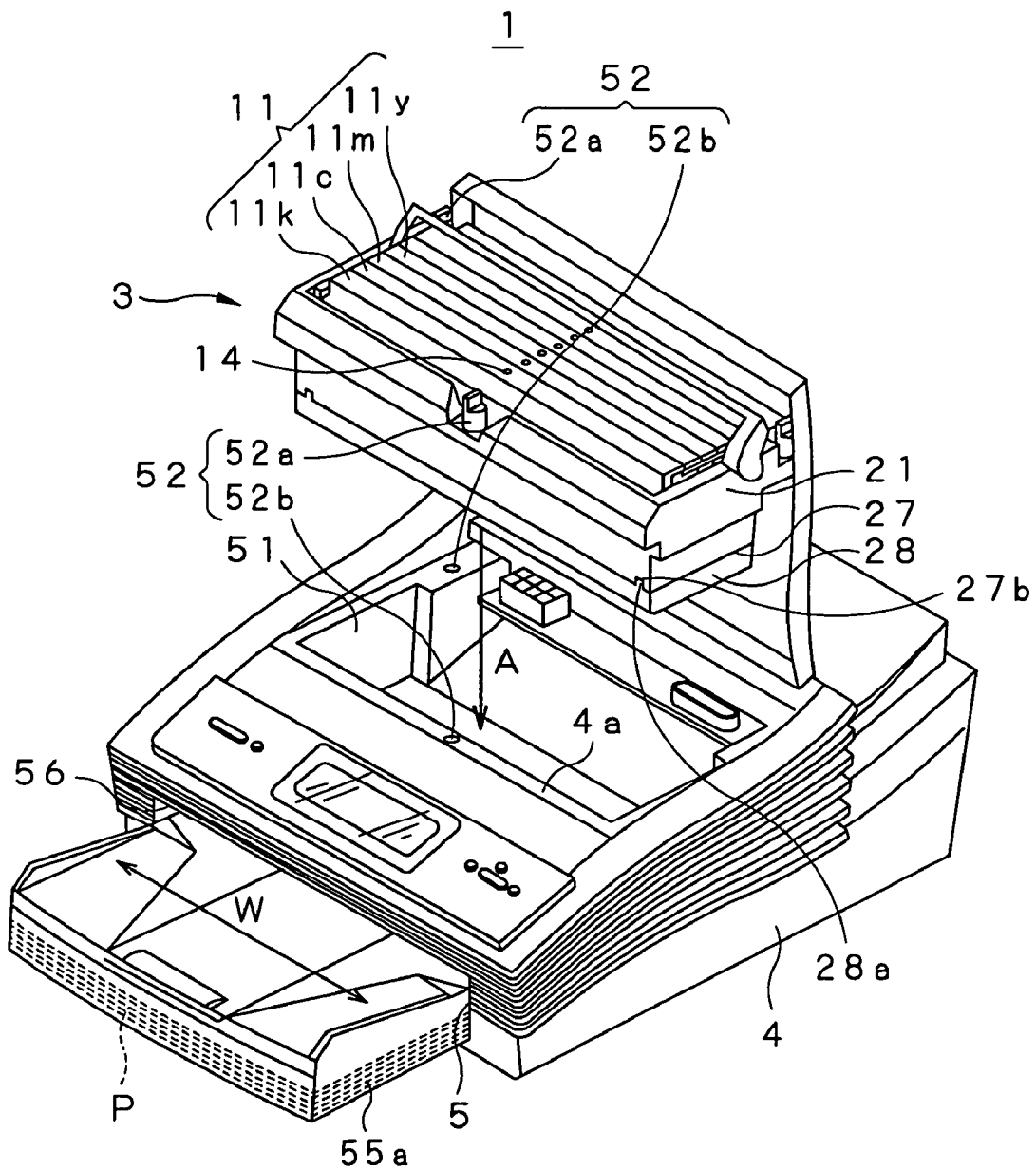
FIG. 1 is a perspective view showing a printer apparatus embodying the present invention.

Referring to the drawings, a recording liquid, a liquid cartridge, a liquid emitting device and a liquid emitting method, embodying the present invention, will be explained in detail. An ink jet printer apparatus, referred to below as a printer apparatus 1, shown in FIG. 1, emits e.g. the ink to a recording paper sheet P, running in a preset direction, for printing an image or a letter/character thereon. Also, the printer apparatus 1 is a so-called line-based printer including a plural number of ink emitting openings (nozzles) juxtaposed substantially in a line along the width of the recording paper sheet P, that is, in a direction indicated by arrow W in FIG. 1, in keeping with the printing width on the recording paper sheet P.

Figure 2:
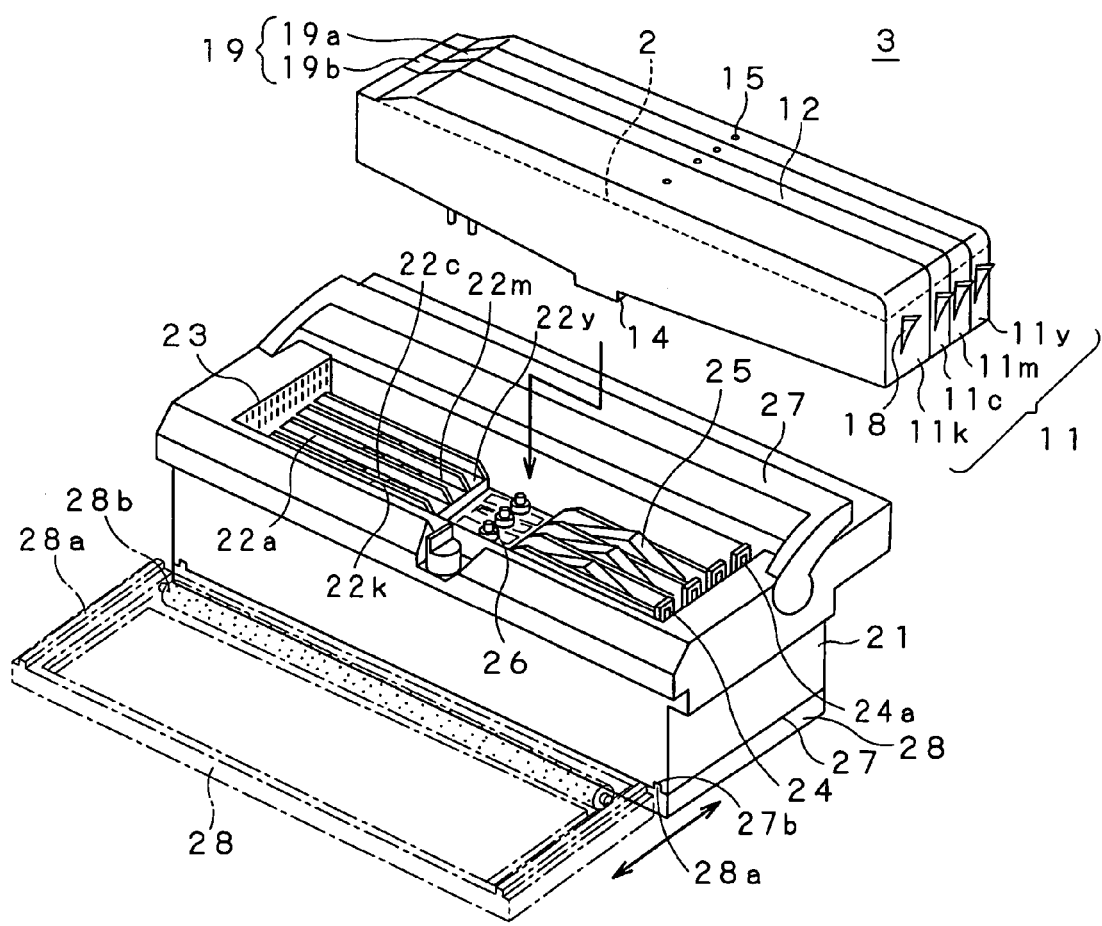
FIG. 2 is a perspective view showing a head cartridge provided to the printer apparatus.
Figure 3:
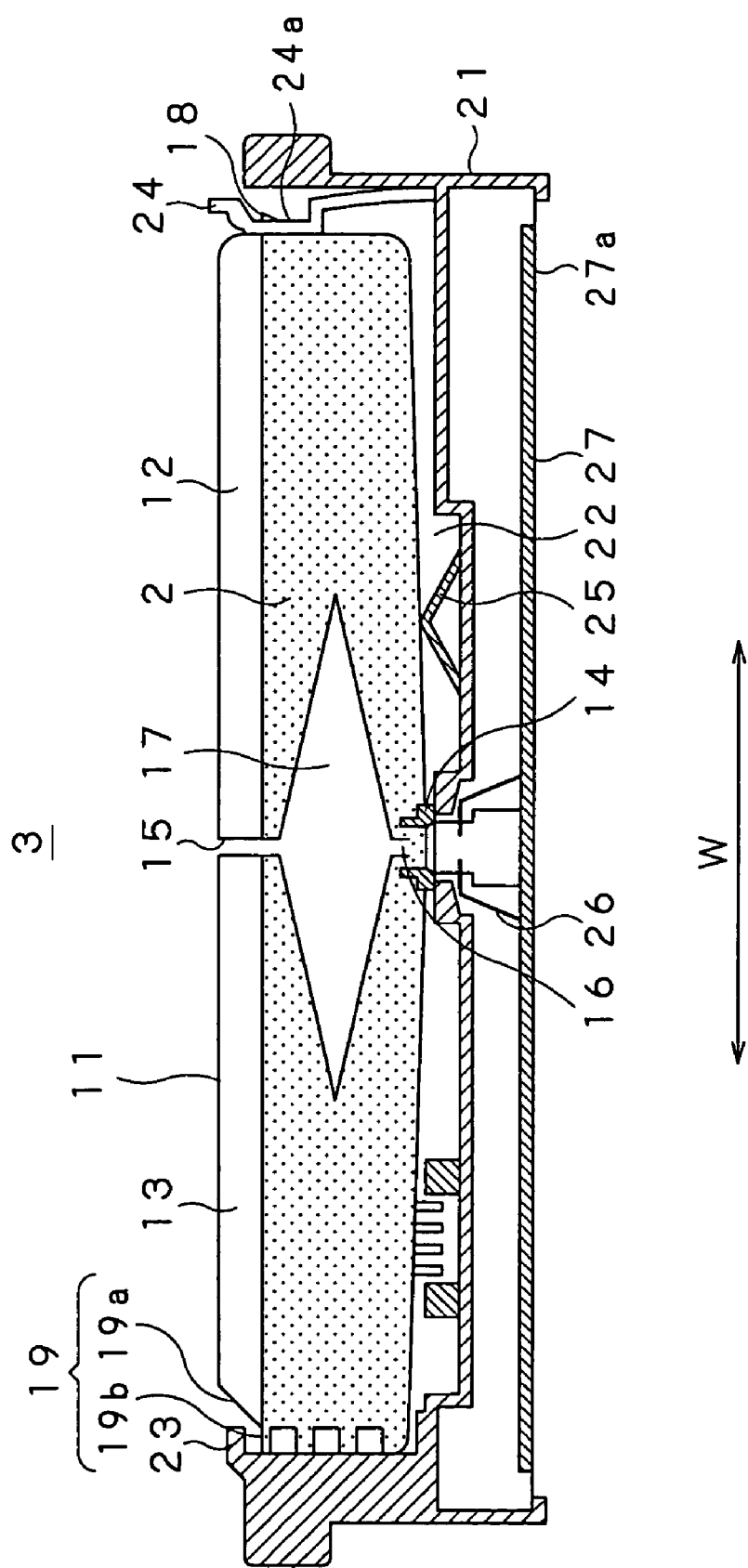
FIG. 3 is a cross-sectional view showing the head cartridge.

Referring to FIGS. 2 and 3, this printer apparatus 1 includes an ink jet printer head cartridge, referred to below as a head cartridge 3, for emitting an ink 2, as a recording liquid for recording an image or a letter/character on the recording paper sheet P, and a main printer body unit 4 for loading the head cartridge 3 thereon. In the present printer apparatus 1, the head cartridge 3 may be mounted on or dismounted from the main printer body unit 4, whilst ink tanks 11y, 11m, 11c and 11k may be mounted on or dismounted from the head cartridge 3. These ink tanks are liquid cartridges containing the ink 2, and operate as ink supply sources for the head cartridge 3. With the printer apparatus 1, the ink tank 11y for yellow, the ink tank 11m for magenta, the ink tank 11c for cyan and the ink tank 11k for black, are usable. The head cartridge 3, that may be mounted on or dismounted from the main printer body unit 4, and the ink tanks 11y, 11m, 11c and 11k, that may be mounted on or dismounted from the head cartridge 3, are consumable items.

With the printer apparatus 1, the recording paper sheet P, housed in a tray 55a, adapted for accommodating a stack of the plural recording paper sheets P therein, may be mounted in a tray loading unit 5, provided on the front bottom part of the main printer body unit 4, for supplying the recording paper sheets P into the inside of the main printer body unit 4. When the tray 55a is loaded on the tray loading unit 5 on the front surface of the main printer body unit 4, the recording paper sheet P is supplied by a paper sheet supplying/discharging mechanism 54 via paper sheet supply port 55 to the back surface side of the main printer body unit 4. The recording paper sheet P, forwarded to the back surface side of the main printer body unit 4, has its running direction reversed by a reversing roll 83, as later explained, and is forwarded on the upper forward running path from the back surface side towards the front side of the main printer body unit 4. Before the recording paper sheet P, forwarded from the back surface side of the main printer body unit 4 towards its front surface, is discharged from a discharge opening 56 provided in the front surface of the main printer body unit 4, printing data, corresponding to input letter/character data, entered from an information processing apparatus 69, such as a personal computer, which will be explained subsequently, is printed as letter/character on the so forwarded recording paper sheet P.

The ink 2, used as a recording liquid in printing, contains a colorant material, such as various pigments or water-soluble dyes, acting as dyestuff, a solvent for dispersing the colorant material, and an ethylene oxide (EO) adduct of a dihydric alcohol with a ratio of an inorganic value (IO) to an organic valur (OV), referred to below as I/O ratio, ranging between 1 and 1.37.

As the colorant material, fine particles of dyes, pigments or colored polymers, well-known in the art, may be used alone or as a mixture. In particular, the water-soluble dyes are preferred. As the water-soluble dyes, any of acidic dyes, direct dyes, basic dyes, reactive dyes or edible dyes may be selected and used, mainly from the perspective of solubility in water, coloration and color fastness.

Specifically, the yellow water-soluble dyes may be enumerated by, for example, C.I. Acid Yellow 17, 23, 42, 44, 79 and 142, C.I. Food Yellow 3 and 4, C.I. Direct Yellow 1, 12, 24, 26, 33, 44, 50, 86, 120, 132, 142 and 144, C.I. Direct Orange 26, 29, 62 and 102, C.I. Basic yellow 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91, C.I. Reactive Yellow 1, 5, 11, 13, 14, 20, 21, 22, 25, 40, 47, 51, 55, 65 and 67.

The magenta water-soluble dyes may be enumerated by, for example, C.I. Acid Red 1, 8, 13, 14, 18, 26, 27, 35, 37, 42, 52, 82, 87, 89, 92, 97, 106, 111, 114, 115, 134, 186, 249, 254 and 289, C.I. Food Red, 7, 9 and 14, C.I. Direct Red 1, 4, 9, 13, 17, 20, 28, 31, 39, 80, 81, 83, 89, 225 and 227, C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112, and C.I. Reactive Red 1, 14, 17, 25, 26, 32, 37, 44, 46, 55, 60, 66, 74, 79, 96 and 97.

The cyan water-soluble dyes may be enumerated by, for example, C.I. Acid blue 9, 29, 45, 92 and 249, C.I. Direct Blue 1, 2, 6, 15, 22, 25, 71, 76, 79, 86, 87, 90, 98, 163, 165, 199 and 202, C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155, and C.I. Reactive Blue 1, 2, 7, 14, 15, 23, 32, 35, 38, 41, 63, 80 and 95.

The black water-soluble dyes may be enumerated by, for example, C.I. Acid Black 1, 2, 7, 24, 26 and 94, C.I. Food Black 1 and 2, C.I. Direct Black 19, 22, 32, 38, 51, 56, 71, 74, 75, 77, 154, 168 and 171, and C.I. Basic Black 3, 4, 7, 11, 12 and 17.

The amount of addition of the aforementioned colorant to the ink 2 ranges between 1 mass wt % to 10 mass wt %, preferably between 3 mass wt % and 5 mass wt %, to the total mass weight of the ink 2, and is determined in consideration of, for example, the viscosity, drying performance, emitting stability of coloration properties of the ink and preservation stability of the printed product.

Although the ink 2 is used dissolved in water, as a solvent, it is also possible to use well-known organic solvents, either singly or in combination, for the purpose of imparting desirable physical properties to the ink 2, improving dispersibility and solubility in water of the colorant and preventing the ink 2 from drying.

More specifically, the organic solvents, usable as solvents, may be enumerated by, for example, lower alcohols, such as ethanol, 2-propanol, polyhydric alcohols, such as ethylene glycol, diethylene glycol, triethylene glycol, polyethylene glycol, polypropylene glycol, 1,5-pentanediol, 1,6-hexanediol, glycerin, 1,2,6-hexanetriol, 1,2,4-butanetriol or petriol, polyhydric alcohol alkylethers, such as ethyleneglycol monoethylether, ethyleneglycol monobuthylether, diethyleneglycol monomethylether, diethyleneglycol monoethylether, diethyleneglycol monobuthylether, tetraethyleneglycol monomethylether, or propyleneglycol monophenylether, polyhydric alcohol allylethers, such as ethyleneglycol monophenylether or ethyleneglycol monobenzylether, nitrogen-containing heterocyclic compounds, such as N-methyl-2-pyrrolidone, N-hydroxyethyl-pyrrolidone, 1,3-dimethylimidazoline, 0-caprolactam or 0-butyrolactone, amides, such as formamide, N-methyl formamide, N,N-dimethylformamide, aimes, such as monoethanolamine, diethanolamine, triethanolamine, monoethylamine, diethylamine or triethylamine, and sulfur-containing compounds, such as dimethyl sulfoxide, sulfolane or thiodiethanol.

The amount of addition of the aforementioned organic solvents in the ink 2 ranges between 5 mass wt % to 50 mass wt %, preferably between 10 mass wt % and 35 mass wt %, based on the total mass weight of the ink 2, and is determined in consideration of the viscosity, drying performance or emission stability of the ink 2, as in the case of the colorant.

Examples of the EO adduct of the a dihydric alcohol, with a hydrocarbon group with the number of carbon atoms not larger than 9, and with the range of the I/O ratio between 1 and 37, include organic compounds shown by the chemical formulas 4 to 8, which may be used either singly or in combination:

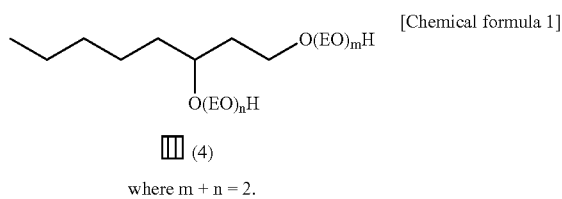

[Chemical formula 1]

(4)

where m + n = 2.

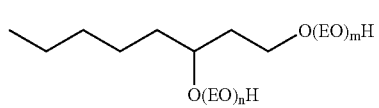

[Chemical formula 2]

(5)

where m + n = 4.

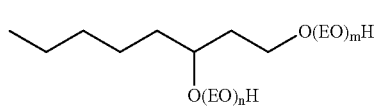

[Chemical formula 3]

(6)

where m + n = 6.

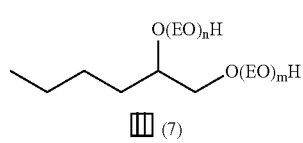

[Chemical formula 4]

(7)

where m + n = 2.

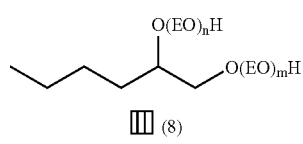

[Chemical formula 5]

(8)

where m + n = 3.

Although the reason is not clear, with the ink 2 containing the aforementioned EO adducts of the a dihydric alcohols, described above, fine bubbles may be suppressed from being generated to prevent a nozzles 42a as later explained from being stopped with the fine bubbles, with the result that failure in ink emission such as the ink not being emitted from the nozzles 42a or the ink being emitted in a direction offset from the intended direction to cause emission deviation, may be prohibited to achieve superior emission stability. Moreover, although the reason is again not clear, in the ink 2, containing the EO adduct of a dihydric alcohol, described above, the optical density of an image obtained on recording by deposition thereof on the recording paper sheet P, that is, on printing, becomes higher to suppress boundary bleeding or speckled color mixing in allover printing to achieve an image printed to high quality.

Moreover, with the ink 2, containing, as the EO adduct of a dihydric alcohol with the number of carbon atoms not larger than 9 and with the I/O ratio ranging between 1 and 1.37, the EO adduct of the dihydric alcohol, with hydrocarbon groups with an iso-branching or a tert-branching, as indicated by the chemical formulas 9 to 16, the ink may further be improved in emission stability, so that a printed image obtained may be of higher quality, because the steric chemical structure of the EO adduct of the a dihydric alcohol is further deterrent to the generation of fine bubbles. In particular, as the ink 2, the compounds indicated by the chemical formulas 11 to 16 are preferably contained as the EO adduct of a dihydric alcohol with the number of carbon atoms not larger than 9 and with the I/O ratio ranging between 1 and 1.37. With the ink containing these compounds either alone or in combination, outstanding operation and effects may be produced.

[Chemical formula 6]

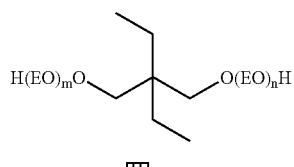

(9)

where m + n = 2.

[Chemical formula 7]

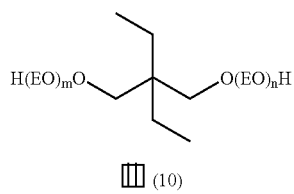

(10)

where m + n = 3.

[Chemical formula 8]

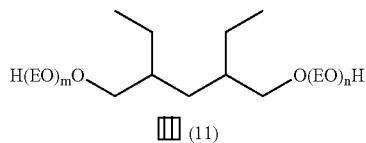

(11)

where m + n = 2.

[Chemical formula 9]

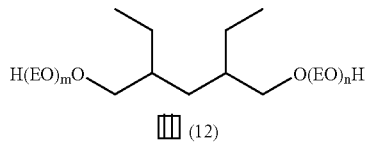

(12)

where m + n = 6.

[Chemical formula 10]

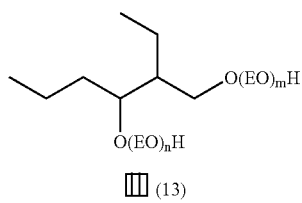

(13)

where m + n = 2.

[Chemical formula 11]

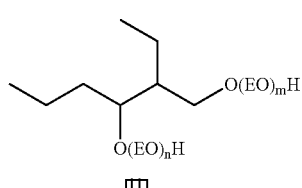

(14)

where m + n = 5.

[Chemical formula 12]

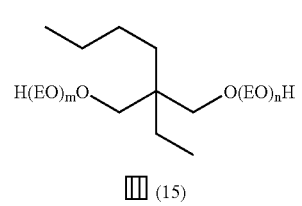

(15)

where m + n = 2.

-continued

[Chemical formula 13]

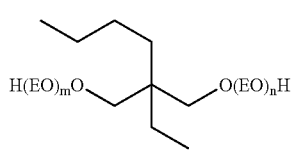

(16)

where m + n = 6.

If, with the EO adduct of the dihydric alcohol, contained in the ink 2, the number of carbon atoms exceeds 9, the ink 2 is increased in viscosity and, depending on the content of the organic compound, the ink 2 tends to be deteriorated in penetrability into the recording paper sheet P. Meanwhile, in the EO adduct of the dihydric alcohol, the number of carbon atoms is spontaneously determined by the value of the I/O ratio.

The EO adduct of a dihydric alcohol, with the number of carbon atoms not larger than 9 and with the I/O ratio ranging between 1 and 1.37, is preferably contained in an amount ranging between 0.1 mass wt % and 5 mass wt %, more preferably, in an amount ranging between 0.5 mass wt % and 3 mass wt %, based on the total mass weight of the ink 2. If the amount of content of the EO adduct of a dihydric alcohol is smaller than 0.1 mass wt %, it becomes difficult to achieve the aforementioned favorable operation and results. If conversely the amount of content of the EO adduct of a dihydric alcohol is larger than 5 mass wt %, the ink 2 tends to be higher in viscosity and deteriorated in penetrability into the recording paper sheet P.

This EO adduct of a dihydric alcohol has the ratio of the inorganic value (IV) to the organic value (OV) not less than 1 and not larger than 1.37, as described above. These inorganic value (IV) and organic value (OV) may be found from discussions on an organic conceptual diagram shown e.g. in Yoshio Koda: "Systematic Organic Qualitative Analysis-Fundamentals and Application", published by SANKYO Publishing Co. Ltd., 1984, Fujita and Akatsuka, "Systematic Organic Qualitative Analysis (for Mixtures)", published by Kazama-Shobou (1974), Nonuhiko Kuroki, "Theoretical Chemistry on Dyes", published by Maki-Shoten, 1966, Tobita and Uchida, "Fine Chemicals", Maruzen (1982) and in Inoue, Uehara and Minami, "Method for Separating Organic Compounds", published by Shoukabou, 1990. The discussions on an organic conceptual diagram are relative with a technique of grasping the physical properties of a subject organic compound by combining 'inorganic properties', denoting the degree of the physical and chemical properties of an organic compound by the force of electrical affinity, and 'organic properties', denoting the degree of the physical and chemical properties of the organic compound by the Van Der Waals force.

That is, with the I/O, if the inorganic value (IV) of a given compound is increased, it is apt to be polarized to be more readily soluble in water and, if the organic value (OV) of a given compound is increased, the compound is increased in oleophilicity and lowered in solubility in water, while being more readily soluble in an organic solvent.

Thus, in the EO adduct of a dihydric alcohol, contained in the ink 2, if the I/O ratio is less than 1, the compound tends to be lowered in hydrophilicity and separated in the ink 2, with the compound then forming oil droplets to deteriorate emission stability of the ink such as by clogging the nozzle 42. If conversely the I/O ratio exceeds 1.37, the EO adduct tends to be lowered in hydrophobicity to produce the tendency for generating fine bubbles in the ink 2, thus again lowering the emission stability.

In the following Table 1, the inorganic values (IV), the organic values (OV) and the I/O values for the EO adducts of a dihydric alcohol, shown by the above chemical formulas 4 to 16, are shown. It is noted that the I/O values have been calculated on the basis of Table 1.1, page 13 of the aforementioned Yoshio Koda: "Systematic Organic Qualitative Analysis-Fundamentals and Application".

TABLE 1

| EO adducts of a dihydric alcohols | Inorganic value (IV) | Organic Value (OV) | I/O |
|---|---|---|---|
| Compound 4 | 240 | 230 | 1.04 |
| Compound 5 | 360 | 290 | 1.24 |
| Compound 6 | 480 | 350 | 1.37 |
| Compound 7 | 240 | 190 | 1.26 |
| Compound 8 | 300 | 220 | 1.36 |
| Compound 9 | 240 | 200 | 1.20 |
| Compound 10 | 300 | 230 | 1.30 |
| Compound 11 | 240 | 240 | 1.00 |
| Compound 12 | 480 | 360 | 1.33 |
| Compound 13 | 240 | 220 | 1.10 |
| Compound 14 | 420 | 310 | 1.35 |
| Compound 15 | 240 | 240 | 1.00 |
| Compound 16 | 480 | 360 | 1.33 |

It will be seen from Table 1 that the I/O value is not less than 1 and not larger than 1.37 for the EO adducts of a dihydric alcohol, shown by the above chemical formulas 4 to 16, and, when contained in the ink 2, such adduct suppresses generation of oil droplets or fine bubbles in the ink 2, so that it is possible to prevent failure in emission, such as non-emission or deviation in emission.

As the EO adducts of a dihydric alcohol, having the hydrocarbon groups with the number of carbon atoms not larger than 9, and having the I/O values ranging between 1 and 1.37, the organic compounds shown by the chemical formulas 4 to 16 are shown. The present invention is, however, not limited to these organic compounds. That is, such EO adducts of a dihydric alcohol, having the I/O values ranging between 1 and 1.37 and the hydrocarbon groups with the number of carbon atoms not larger than 9, may be used as a surfactant for the ink 2 with favorable operation and effect comparable with those of the compounds of the chemical formulas 4 to 16.

In a 25° C. atmosphere, the dynamic surface tension of the ink 2 at 20 Hz ($D_{20}$), that is, the surface tension when air bubbles are generated every 50 msec, and that at 1 Hz ($D_1$), that is, the surface tension when air bubbles are generated every sec, are set to not less than 30 mN/m and to not larger than 38 mN/m, respectively. With the ink 2, having these values of the dynamic surface tension, the optical density becomes higher, while the boundary bleeding and speckled color mixing in all-over printing may further be suppressed. The reason is that, in conjunction with the above-described operation and effect of having contained in the ink 2 the EO adducts of a dihydric alcohol, having the hydrocarbon groups with the number of carbon atoms not larger than 9, and having the I/O values ranging between 1 and 1.37, the rate of penetration of the ink 2 into the recording paper sheet P, in other words, the spreading of the ink 2 from its deposited position along the direction of thickness and along the planar direction of the recording paper sheet P, along its pulp fibers, becomes uniform.

It is noted that the dynamic surface tension may be measured by e.g. a dynamic surface tension meter produced on the basis of the known principle for measuring the dynamic surface tension as disclosed in, for example the Japanese Laid-Open Patent Publication 63-31237. For example, a dynamic bubble pressure surface tension meter, manufactured by KRUSS, capable of measuring the dynamic surface tension by the maximum bubble pressure method (Trade name: BP-2), or a dynamic surface tension measurement device, manufactured by LAUDA (trade name: MPT2), may be used.

In the ink 2, the dynamic surface tension may basically be adjusted by selecting the sort of the EO adduct of the dihydric alcohol, having a hydrocarbon group with 9 or less carbon atoms and having the I/O ratio ranging between 1 and 1.37, or by adjusting the amount of the adduct to be contained in the ink 2. However, in case it is difficult to adjust the dynamic surface tension satisfactorily, it is possible to add routinely used surfactants insofar as such known surfactants are not deterrent to the operation and effect that may be accrued from the EO adduct of a dihydric alcohol having a hydroxyl group with 9 or less carbon atoms and having the value of the I/O value ranging between 1 and 1.37. Examples of the routinely used surfactants include special phenol based nonionic surfactants, such as polycyclic phenol ethoxylates, ester-based nonionic surfactants, such as ethylene oxide adducts of glyceride, polyethylene glycol oleate, polyoxyalkylene taloate, sorbitan laurylester, sorbitan oleylester, and polyoxyethylene sorbitane oleylester, amide-based non-ionic surfactants, such as coconut oil fatty acid diethanol amide, or polyoxyethylene coconut oil fatty acid diethanol amide and polyoxyethylene coconut oil fatty acid monoethanol amide, acetylene glycol and ethylene oxide adducts thereof, anionic surfactants, such as alcohol sulfate sodium salts, higher alcohol sulfate sodium salts, polyoxyethylene alkyl phenylether sulfuric acid ester ammonium salts, and alkylbenzene sulfonic acid sodium salts, cationic surfactants, such as mono long chain alkyl cation, di long chain alkyl cation or alkylamine oxide, and amphoteric surfactants, such as laurylamido propyl acetic acid betaine and laurylamino acetic acid betaine. These known surfactants may be used alone or as a mixture.

The aforementioned known surfactants are added in an amount not larger than 30 mass wt % and preferably not larger than 20 mass wt %, based on the total weight of the EO adduct of a dihydric alcohol having a hydrocarbon group with 9 or less carbon atoms and having the I/O ratio value ranging between 1 and 1.37, contained in the ink 2. If the known surfactants are added in an amount exceeding 30 mass wt % of the total weight of the EO adduct of a dihydric alcohol, having a hydrocarbon group with 9 or less carbon atoms and having the I/O ratio value ranging between 1 and 1.37, the risk is high that the optical density is lowered and boundary bleeding or speckles in color mixing in all-over printing.

In addition to the aforementioned colorants, solvents, EO adducts of a dihydric alcohols, functioning as a surfactant, having hydrocarbon groups with 9 or less carbon atoms and also having the I/O ratio value ranging between 1 and 1.37, and the routinely used surfactants, viscosity adjustment agents, pH adjustment agents, antiseptics, rust-proofing agents or mildew-preventatives, may also be added to the ink 2. Specifically, the viscosity adjustment agents and the pH adjustment agents may be exemplified by proteins, such as gelatin and casein, natural rubber, such as gum Arabic, cellulose derivatives, such as methyl cellulose, carboxy methyl cellulose or hydroxylmethyl cellulose, natural high polymeric materials, such as ligninsulfonates or shellac, polyacrylates, styrene-acrylate copolymer, polyvinyl alcohol and polyvinyl pyrrolidone. These may be used alone or in combination. The antiseptics, rust-proofing agents or mildew-preventatives may be exemplified by benzoic acid, dichlorophene, hexachlophene, sorbic acid, p-hydroxybenzoate and ethylene diamine tetraacetate (EDTA), these being used either alone or in combination.

The above ink 2 may be prepared by mixing the aforementioned colorant, solvent and the EO adduct of a dihydric alcohol, having a hydrocarbon group with 9 or less carbon atoms and having the I/O ratio ranging between 1 and 1.37, by predetermined proportions, and by agitating and dispersing the resulting mass, such as by a screw, under heating to ambient temperature or to a temperature on the order of 40° C. to 80° C.

Referring to FIGS. 2 and 3, the ink 2, prepared as described above, is accommodated in each ink tank. It is noted that the ink with a yellow color is accommodated in the ink tank 11y, the ink with a magenta color is accommodated in the ink tank 11m, the ink with a cyan color is accommodated in the ink tank 11c and the ink with a cyan color is accommodated in the ink tank 11k.

The head cartridge 3, that may be mounted to and dismounted from the main printer body unit 4, making up the printer apparatus 1, and the ink tanks 11y, 11m, 11c and 11k, will now be explained with reference to the drawings.

The head cartridge 3 for printing on the recording paper sheet P is loaded from the side of the upper surface of the main printer body unit 4, that is, from the direction of an arrow A in FIG. 1, and emits the ink 2 onto the recording paper sheet P, fed by the paper sheet supplying/discharging mechanism 54, in order to emit the ink 2 to effect printing.

The head cartridge 3 pulverizes the ink 2 into extremely fine particles, by the pressure generated by pressure generating means of, for example the electro-thermal transducing type or an electromechanical transducing type device, to spray the ink as fine droplets onto the major surface of the support, such as the recording paper sheet P. Specifically, the head cartridge 3 includes a main cartridge body unit 21, on which are loaded the ink tanks 11y, 11m, 11c and 11k, as vessels, each of which is charged with the ink 2. In the following, the ink tanks 11y, 11m, 11c and 11k are also simply referred to as an ink tank 11.

The ink tank 11, which may be mounted to and dismounted from the head cartridge 3, includes a tank vessel 12, prepared on injection molding e.g. a resin material, such as polypropylene, exhibiting strength and resistance against the ink. The tank vessel 12 is formed to a substantially rectangular shape, having a dimension substantially equal to the width-wise size of the recording paper sheet P, traveling along its longitudinal direction, for thereby increasing the capacity of the ink stored therein.

Specifically, the tank vessel 12, forming the ink tank 11, is provided with an ink reservoir 13, accommodating the ink 2, an ink supplying unit 14 for supplying the ink 2 from the ink reservoir 13 into the main cartridge body unit 21 of the head cartridge 3, a series of communication ports 15 for taking in air from outside into the ink reservoir 13, an air inlet duct 16 for introducing air taken in via communication ports 15 into the ink reservoir 13, an ink storage 17 for transient storage of the ink 2 between the communication ports 15 and the air inlet duct 16, a retention lug 18 for retaining the ink tank 11 by the main cartridge body unit 21 and an engagement step 19.

The ink reservoir 13, formed of a material of high air tightness, delimits a spacing in which to accommodate the ink 2. The ink reservoir 13 is formed to a substantially rectangular shape having a long-side dimension substantially equal to the width-wise size of the recording paper sheet P, traveling along its longitudinal direction, that is, along the direction indicated by arrow W in FIG. 3.

The ink supplying unit 14 is provided at a mid part on the lower surface of the ink reservoir 13. This ink supplying unit 14 is a substantially protuberantly-shaped nozzle kept in communication with the ink reservoir 13. The distal end of the nozzle is fitted to a connecting part 26 of the head cartridge 3 as later explained to connect the tank vessel 12 of the ink tank 2 with the main cartridge body unit 21 of the head cartridge 3.

Figure 4A:
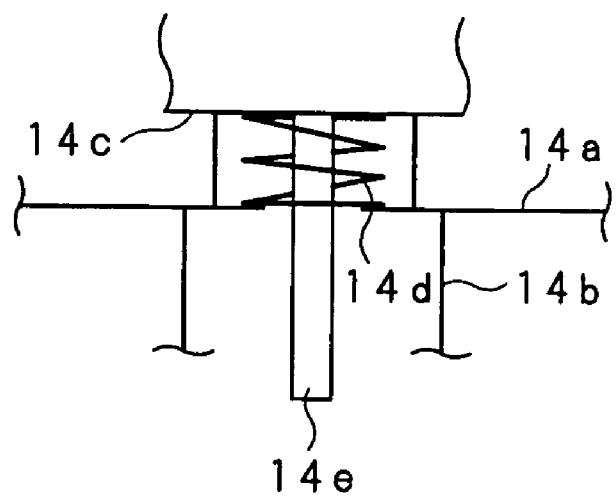
FIGS. 4A and 4B show an ink supply part when an ink tank is fitted to the head cartridge, where
Figure 4B:
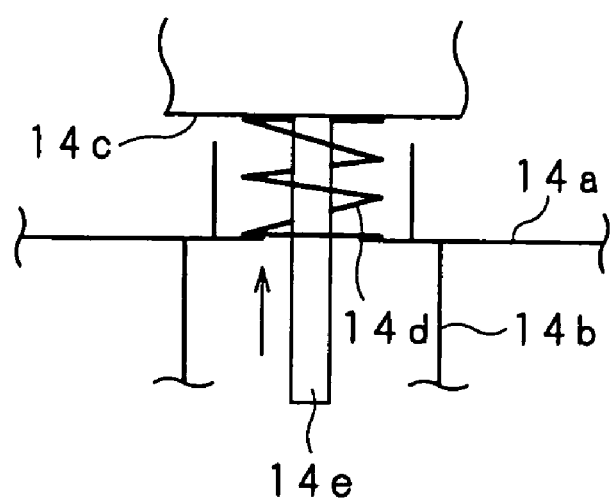

Referring to FIGS. 4A and 4B, the ink supplying unit 14 is provided with a supply port 14b for supplying the ink 2 to a bottom surface 14a of the ink tank 11. On this bottom surface 14a, there are provided a valve 14c for opening/closing the supply port 14b, a coil spring 14d for biasing the valve 14c in a direction of closing the supply port 14b, and an opening/closing pin 14e for opening/closing the valve 14c. In a stage prior to loading the ink tank 11 to the main cartridge body unit 21 of the head cartridge 3, the supply port 14b, connected to the connecting part 26 of the head cartridge 3 for supplying the ink 2, is closed by the valve 14c being biased in a direction of closing the supply port 14b, under the bias of the coil spring 14d, as a biasing member, as shown in FIG. 4A. When the ink tank 11 is loaded on the main cartridge body unit 21, the opening/closing pin 14e is uplifted in a direction opposite to the biasing direction of the coil spring 14d, by an upper part of the connecting part 26 of the main cartridge body unit 21 forming the head cartridge 3, as shown in FIG. 4B. The opening/closing pin 14e, thus uplifted, uplifts the valve 14c, against the bias of the coil spring 14d, for opening the supply port 14b. This connects the ink supplying unit 14 of the ink tank 11 to the connecting part 26 of the head cartridge 3, for establishing communication between the ink reservoir 13 and an ink well 31 to enable the ink 2 to be supplied to the ink well 31.

When the ink tank 11 is extracted from the connecting part 26 of the head cartridge 3, that is, when the ink tank 11 is dismounted from a loading part 22 of the head cartridge 3, the uplifted state of the valve 14c by the opening/closing pin 14e is canceled, such that the valve 14c is moved in the biasing direction of the coil spring 14d to close the supply port 14b. This prohibits the ink 2 from leaking from the inside of the ink reservoir 13 even in a state in which the distal end of the ink supplying unit 14 is directed downwards just before the ink tank 11 is loaded on the main cartridge body unit 21. When the ink tank 11 is extracted from the main cartridge body unit 21, the valve 14c immediately closes the supply port 14b, and hence the ink 2 may be prohibited from leaking from the distal end of the ink supplying unit 14.

Referring to FIG. 3, the communication port 15 is an air take-in port for taking in air from outside the ink tank 11 into the ink reservoir 13. The communication port 15 is provided at a preset location in the upper surface of the tank vessel 12 facing the outside when the ink tank is loaded on the loading part 22, here at a mid part on the upper surface of the vessel, so that the communication port faces the outside to take in outside air even when the ink tank is mounted on the loading part 22. The communication port 15 takes in air into the ink tank in an amount corresponding to a decreased amount of the ink 2 in the ink reservoir 13 when the ink tank 11 is loaded on the main cartridge body unit 21 and the ink 2 has flown down from the ink reservoir 13 towards the main cartridge body unit 21.

The air inlet duct 16 sets up communication between the ink reservoir 13 and the communication port 15 to introduce air taken in at the communication port 15 into the ink reservoir 13. Thus, even if, when the ink tank 11 is loaded on the main cartridge body unit 21, the ink 2 is supplied to the main cartridge body unit 21 of the head cartridge 3, such that the amount of the ink 2 in the ink reservoir 13 is decreased to decrease the internal pressure, air is introduced via air inlet duct 16 into the ink reservoir 13, so that the internal pressure is maintained in a state of equilibrium to assure proper supply of the ink 2 into the main cartridge body unit 21.

The ink storage 17 is provided between the communication port 15 and the air inlet duct 16 for transiently storing the ink 2, so that, when the ink 2 has leaked out from the air inlet duct 16 communicating with the ink reservoir 13, the ink 2 will not flow outwards precipitously. This ink storage 17 is lozenge shaped, with the long diagonal line extending along the longitudinal direction of the ink reservoir 13. The inlet duct 16 is located at an apex point of the ink storage, lying at a lowermost point of the ink reservoir 13, that is, at the lower end of the short diagonal line of the lozenge shape, such that the ink 2 introduced from the ink reservoir 13 will again be restored into the ink reservoir 13. The communication port 15 is provided at the uppermost end of the short diagonal line of the lozenge shape such that the ink 2 introduced from the ink reservoir 13 will hardly leak to outside through the port 15.

The retention lug 18 is provided on one lateral short side of the ink tank 11 and is engaged in an engagement opening 24*a* formed in a latch lever 24 of the main cartridge body unit 21 of the head cartridge 3. This retention lug 18 has an upper surface formed as a planar surface extending substantially at right angles to the lateral surface of the ink reservoir 13, while having a lower surface inclined from the lateral surface to the upper surface.

The engagement step 19 is provided at an upper part of the ink tank 11 on the opposite lateral side with respect to the lateral side carrying the retention lug 18. The engagement step 19 is made up by an inclined surface 19*a*, connecting to the upper surface of the tank vessel 12, and by a planar surface 19*b* consecutive to the other end of the inclined surface 19*a* and extending substantially parallel to the upper surface of the tank vessel 12. Since the ink tank 11 is provided with the engagement step 19, the lateral surface thereof provided with the planar surface 19*b* is lower by one step than the upper surface of the tank vessel 12. It is by this step that the ink tank is engaged with an engagement part 23 of the main cartridge body unit 21. The engagement step 19 is provided on the inserting side lateral surface of the ink tank when the ink tank is inserted into the loading part 22 of the head cartridge 3. The engagement step is engaged with the engagement part 23 of the loading part 22 of the head cartridge 3 so as to act as a fulcrum point of rotation when the ink tank 11 is mounted on the loading part 22.

The above-described ink tank 11 includes, in addition to the above component parts, a residual ink quantity detection unit for detecting the residual quantity of the ink 2 in the ink reservoir 13, and a discriminating unit for discriminating the ink tanks 11*y*, 11*m*, 11*c* and 11*k*.

The head cartridge 3, on which to load the ink tanks 11*y*, 11*m*, 11*c* and 11*k*, accommodating the yellow, magenta, cyan and black inks 2, respectively, as described above, will now be explained in detail.

The head cartridge 3 is made up by the aforementioned ink tank 11 and the main cartridge body unit 21, as shown in FIGS. 2 and 3. The main cartridge body unit 21 includes loading zones 22*y*, 22*m*, 22*c* and 22*k*, on which is loaded the ink tank 11. When these loading zones are denoted in their entirety, they are simply referred to below as the loading part 22. The main cartridge body unit 21 also includes the engagement part 23 and the latch lever 24 for securing the ink tank 11, a biasing member 25 for biasing the ink tank 11 in a takeout direction, the connecting part 26 connected to the ink supplying unit 14 so as to be supplied with the ink 2, an ink emitting head 27 for emitting the ink 2, and a head cap 28 for protecting the ink emitting head 27.

The loading part 22, on which to load the ink tank 11, has a substantially recessed upper surface for use as an inserting/ejecting opening for the ink tank 11. In this recessed upper surface, there are arrayed the four ink tanks 11 in juxtaposition in a direction substantially perpendicular to the width of the recording paper sheet P, that is, in a direction along the feed direction of the recording paper sheet P. The loading part 22, in which is loaded the ink tank 11, is of a length elongated along the printing width, as is the ink tank 11. The ink tank 11 is housed and loaded in the main cartridge body unit 21.

The loading part 22 is a zone in which the ink tank 11 is loaded, as shown in FIG. 2. The zones of the loading part, on which are loaded the ink tank 11*y* for yellow, the ink tank 11*m* for magenta, the ink tank 11*c* for cyan and the ink tank 11*k* for black, are labeled 22*y*, 22*m*, 22*c* and 22*k*, respectively. The loading zones 22*y*, 22*m*, 22*c* and 22*k* are separated from each other by partitions 22*a*. Meanwhile, the ink tank 11*k* for black is of a larger thickness in order to accommodate a larger quantity of the ink in view of the generally larger consumption of the black ink, and hence the ink tank 11*k* for black is larger in width than the remaining ink tanks. Consequently, the loading zone 22*k* is broader in width than the remaining loading zones 22*y*, 22*m*, 22*c*, 22*k* in keeping with the thickness of the ink tank 11*k*.

The opening end of the loading part 22, on which is loaded the ink tank 11, is provided with the engagement part 23, as shown in FIG. 3. This engagement part 23 is provided at a longitudinal end of the loading part 22 so as to be engaged with the engagement step 19 of the ink tank 11. The ink tank 11 may be mounted on the loading part 22 by obliquely inserting the ink tank 11 into the loading part 22, with the engagement step 19 of the ink tank 11 first. The side of the ink tank 11 not provided with the engagement step 19 may then be rotated towards the loading part 22, with the location of engagement of the engagement step 19 of the ink tank 11 as the fulcrum point of rotation, for loading the ink tank on the loading part 22. In this manner, the ink tank 11 may readily be mounted on the loading part 22.

The latch lever 24 is formed by bending a spring sheet and is provided on the lateral surface of the loading part 22 opposite to the engagement part 23, that is, on the opposite longitudinal end of the loading part 22. The proximal end of the latch lever 24 is provided as one with the bottom surface of the opposite lateral surface along the longitudinal end of the loading part 22 so that the distal end thereof is resiliently flexed in a direction towards and away from the aforementioned lateral surface. The distal end of the latch lever 24 is provided with an engagement opening 24*a*. The latch lever 24 is resiliently deflected the instant the ink tank 11 is mounted on the loading part 22, with the retention lug 18 of the ink tank 11 then engaging with the engagement opening 24*a* to prevent the ink tank 11 from becoming detached from the loading part 22 on which has been loaded the ink tank.

The biasing member 25 is a spring sheet provided on the bottom surface towards the lateral surface provided with the engagement step 19 of the ink tank 11, with the spring sheet being bent for biasing the ink tank 11 in the direction of dismounting the ink tank 11. The biasing member 25 includes a top formed by bending and may be resiliently deflected in a direction towards and away from the aforementioned bottom surface, in order to thrust the bottom surface of the ink tank 11 at the top to bias the ink tank 11 loaded on the loading part 22 in a direction of being dismounted from the loading part 22. When the retention lug 18 is disengaged from the engagement opening 24*a* of the latch lever 24, the biasing member 25 ejects the ink tank 11 from the engagement part 23.

On mid parts along the longitudinal direction of the loading zones 22*y*, 22*m*, 22*c* and 22*k*, there is provided a connecting part 26 the ink supplying units 14 of the ink tanks 11*y*, 11*m*, 11*c* and 11*k* are connected to when the ink tanks 11*y*, 11*m*, 11*c* and 11*k* are mounted to the loading zones 22*y*, 22*m*, 22*c* and 22*k*, respectively. This connecting part 26 operates as an ink supply duct for delivery of the ink 2 from the ink supplying unit 14 of the ink tank 11 mounted on the loading part 22 to the ink emitting head 27 provided to the bottom surface of the main cartridge body unit 21.

Figure 5:
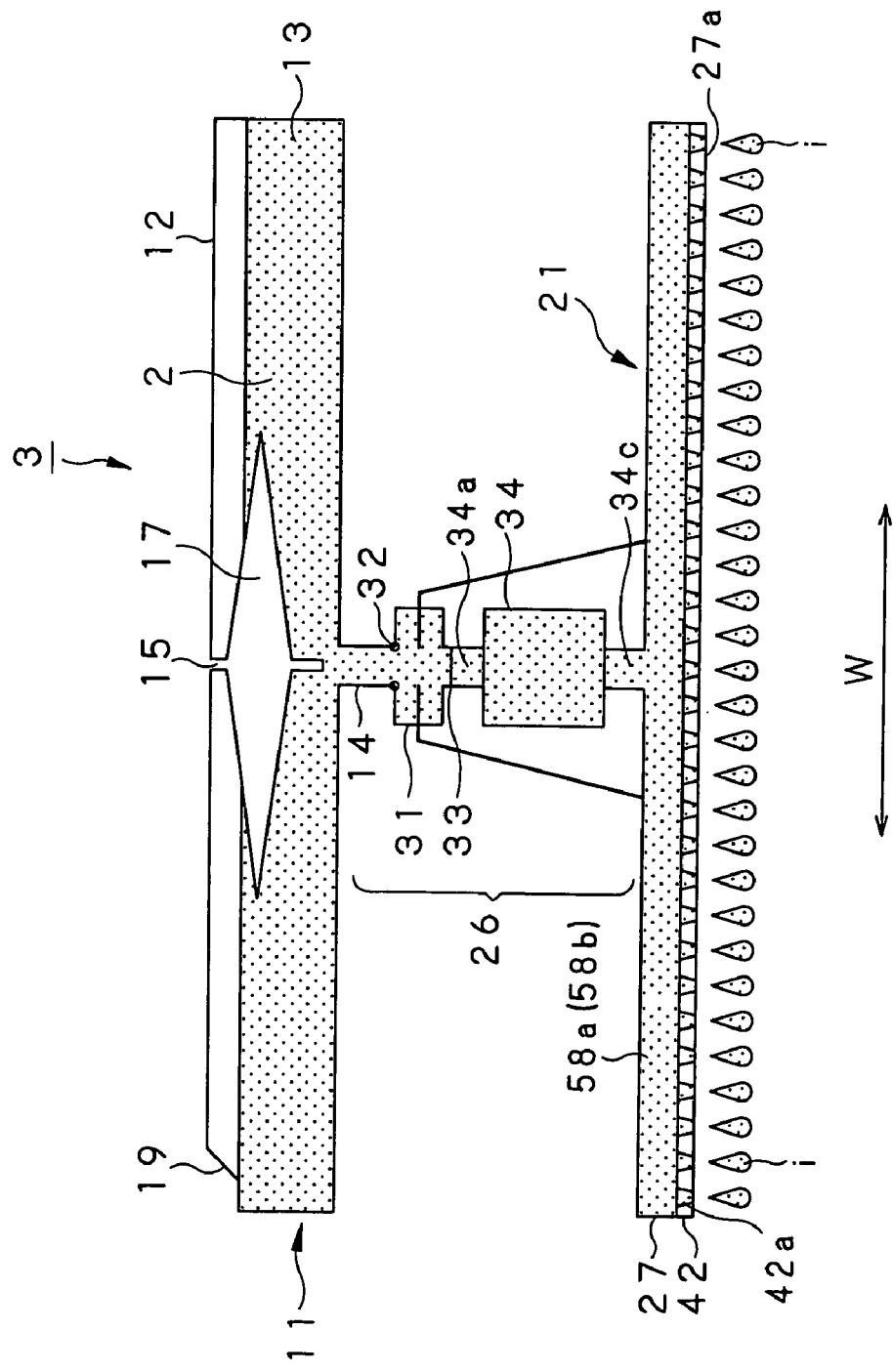
FIG. 5 is a schematic view showing the relationship between the ink tank and an ink emitting head in the head cartridge.

Specifically, the connecting part 26 includes an ink well 31 for storing the ink 2 supplied from the ink tank 11, a sealing member 32 for sealing the ink supplying unit 14 connected to the connecting part 26, a filter 33 for removing impurities in the ink 2 and a valving mechanism 34 for opening/closing the supply duct to the ink emitting head 27, as shown in FIG. 5.

The ink well 31 is a spacing connecting to the ink supplying unit 14 and in which the ink 2 is stored. The sealing member 32 is provided on the top of the ink well 31 and, when the ink supplying unit 14 of the ink tank 11 is connected to the ink well 31 of the connecting part 26, the sealing member hermetically seals the boundary between the ink well 31 and the ink supplying unit 14 in order to prevent the ink 2 from leaking to outside. The filter 33 removes dust and dirt, eventually mixed into the ink 2, such as during the mounting and the dismounting of the ink tank 11, and is provided downstream of the ink well 31.

Figure 6A:
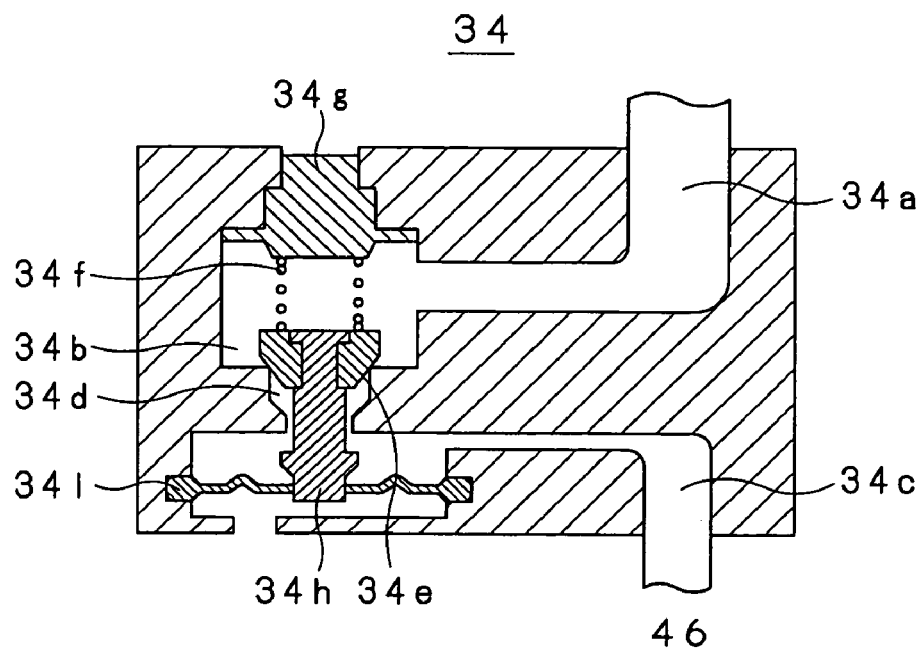
FIGS. 6A and 6B show a valving mechanism in a connecting part of the ink tank, where
Figure 6B:
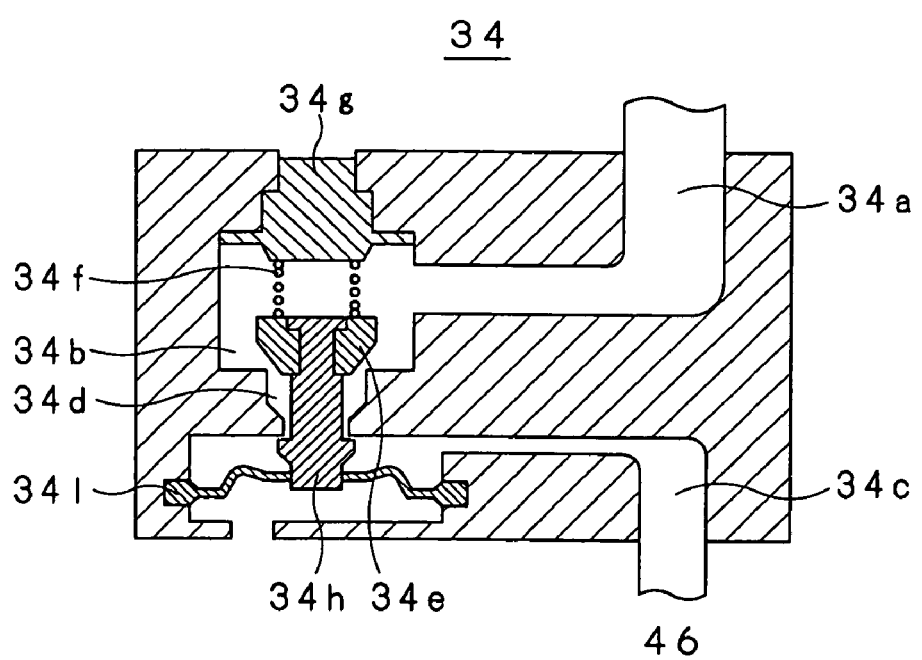

Referring to FIGS. 6A and 6B, the valving mechanism 34 includes an ink inlet duct 34*a*, the ink 2 is supplied to from the ink well 31, an ink chamber 34*b*, the ink 2 flows to from the ink inlet duct 34*a*, an ink effluent duct 34*c*, on which the ink 2 flows out from the ink chamber 34*b*, an opening 34*d* provided between the ink inlet duct 34*a* and the ink effluent duct 34*c* of the ink chamber 34*b*, a valve 34*e* for opening/closing the opening 34*d*, a biasing member 34*f* for biasing the valve 34*e* in the direction of closing the opening 34*d*, a negative pressure adjustment screw 34*g* for adjusting the biasing force of the biasing member 34*f*, a valve shaft 34*h* connected to the valve 34*e* and a diaphragm 34*i* connected to the valve shaft 34*h*.

The ink inlet duct 34*a* is a supply duct connecting to the ink reservoir 13 for supplying the ink in the ink reservoir 13 in the ink tank 11 through the ink well 31 to the ink emitting head 27. The ink inlet duct 34*a* is provided for extending from the bottom side of the ink well 31 to the ink chamber 34*b*. The ink chamber 34*b* is a substantially rectangular spacing, formed as one with the ink inlet duct 34*a*, ink effluent duct 34*c* and with the opening 34*d*. The ink 2 flows via the ink inlet duct 34*a* into the ink chamber 34*b* to flow out through the opening 34*d* and the ink effluent duct 34*c*. The ink effluent duct 34*c*, supplied with the ink 2 from the ink chamber 34*b* through the opening 34*d*, connects to the ink emitting head 27. The ink effluent duct 34*c* extends from the bottom side of the ink chamber 34*b* to the ink emitting head 27.

The valve 34*e* closes the opening 34*d* to separate the side of the ink inlet duct 34*a* and the side of the ink effluent duct 34*c* from each other. The valve 34*e* is moved in the up-and-down direction under the biasing force of the biasing member 34*f*, the force of restoration of the diaphragm 34*i*, connected to the valve shaft 34*h*, and under the negative pressure of the ink 2 on the side of the ink effluent duct 34*c*. When at the lower end of the valve stroke, the valve 34*e* closes the opening 34*d* for separating the ink inlet duct 34*a* and the side of the ink effluent duct 34*c* of the ink chamber 34*b* from each other for interrupting the supply of the ink 2 to the ink effluent duct 34*c*. When located at the lower end of the valve stroke, the valve 34*e*, against the bias of the biasing member 34*f*, the valve 34*e* does not separate the ink inlet duct 34*a* and the side of the ink effluent duct 34*c* of the ink chamber 34*b* from each other to enable the ink 2 to be supplied to the ink emitting head 27. Although there is no limitation to the sort of the material of the valve 34*e*, it is formed e.g. of an elastic rubber, such as elastomer, in order to assure sufficient closing characteristics.

The biasing member 34*f* is e.g. a compression coil spring and interconnects the negative pressure adjustment screw 34*g* and the valve 34*e* between the upper surface of the valve 34*e* and the upper surface of the ink chamber 34*b* to bias the valve 34*e* in a direction of closing the opening 34*d* under its force of elasticity. The negative pressure adjustment screw 34*g* adjusts the biasing force of the biasing member 34*f*. By adjusting the negative pressure adjustment screw 34*g*, it is possible to adjust the biasing force of the biasing member 34*f*. By so doing, the negative pressure of the ink 2 for actuating the valve 34*e*, configured for opening/closing the opening 34*d*, may be adjusted by the negative pressure adjustment screw 34*g*, as will be explained in detail subsequently.

The valve shaft 34*h* has its one end connected to the valve 34*e* and its other end to the diaphragm 34*i* for producing concerted movements thereof. The diaphragm 34*i* is a thin sheet of an elastic material connected to the opposite side end of the valve shaft 34*h*. The diaphragm 34*i* is a thin flexible sheet connected to the valve shaft 34*h*. This diaphragm 34*i* includes a major surface towards the ink effluent duct 34*c* of the ink chamber 34*b* and the opposite side major surface contacting with atmospheric air, and is elastically deflected towards the atmospheric air side and towards the ink effluent duct 34*c* side under the atmospheric pressure and under the negative pressure of the ink 2.

In the above-described valving mechanism 34, the valve 34*e* is thrust for closing the opening 34*d* of the ink chamber 34*b* under the bias of the biasing member 34*f* and under the biasing force of the diaphragm 34*i*, as shown in FIG. 6A. When the ink 2 has been emitted from the ink emitting head 27, such that the negative pressure of the ink 2 in the ink chamber 34*b* towards the ink effluent duct 34*c* divided from the ink chamber by the opening 34*d*, is increased, the diaphragm 34*i* is uplifted by the atmospheric pressure under the negative pressure of the ink 2, as shown in FIG. 6B, for uplifting the valve 34*e*, along with the valve shaft 34*h*, against the bias of the biasing member 34*f*, as shown in FIG. 6B. At this time, the opening 34*d* between the ink inlet duct 34*a* and the ink effluent duct 34*c* of the ink chamber 34*b* is opened to supply the ink 2 from the ink inlet duct 34*a* towards the ink effluent duct 34*c*. When the negative pressure of the ink 2 is decreased, the diaphragm 34*i* is restored to its original shape. The biasing force of the biasing member 34f lowers the valve 34e, along with the valve shaft 34h, for closing the ink chamber 34b. Thus, in the valving mechanism 34, the above-described operation is repeated each time the ink 2 is emitted to increase its negative pressure.

Moreover, with the present connecting part 26, the amount of the ink 2 in the ink reservoir 13 is decreased when the ink 2 in the ink reservoir 13 is supplied to the ink chamber 34b. At this time, the atmospheric air is introduced into the ink tank 11 from the air inlet duct 16. The air introduced into the ink tank 11 is forwarded to an upper part of the ink tank 11. This restores the state prior to emission of the ink droplets i from nozzles 42a, as later explained, to set up a state of equilibrium. In this state of equilibrium, there is scarcely no ink 2 contained in the air inlet duct 16.

The connecting part 26 is of a complicated structure, as described above. It is through this complicated structure that the ink 2 is transported. Since the EO adduct of a dihydric alcohol, having a hydrocarbon group with 9 or less carbon atoms and having the I/O ratio ranging between 1 and 1.37, is contained in the ink 2, fine bubbles may be prevented from being produced in the ink 2 due to the opening/closing operation of the valve 34e or transportation of the ink 2 through ink ducts, such that the ink not admixed with bubbles may be supplied to the ink emitting head 27.

The ink emitting head 27 is arranged for extending along the bottom surface of the main cartridge body unit 21, and a plurality of nozzles 42a, as ink emission ports for emitting ink droplets i, supplied from the connecting part 26, are arranged as shown in FIG. 5. Specifically, these nozzles 42a are arrayed substantially in a line along the width of the recording paper sheet P, that is, in a direction indicated by arrow W in FIG. 5, from one color to the next.

A head cap 28 is a cover provided for protecting the ink emitting head 27, as shown in FIG. 2. The head cap is retreated from the ink emitting head 27 during the printing operation.

The head cap 28 is provided with a pair of engagement ribs 28a on both ends along the opening/closing direction indicated by arrow W in FIG. 2, and with a cleaning roll 28b, extending along the longitudinal direction, for sucking off excess ink 2 deposited on an ink emitting surface 27a of the ink emitting head 27. The engagement ribs 28a of the head cap 28 are engaged in a pair of engagement grooves 27b, formed in the ink emitting surface 27a for extending substantially at right angles to the direction of the arrow W in FIG. 2, so that the head cap is moved for opening/closure along the short side of the ink tank 11, that is, in a direction substantially at right angles to the direction W in FIG. 2. With the head cap 28, excess ink 2 may be sucked off during the opening/closure operation, by the cleaning roll 28b being run in rotation in abutting contact with the ink emitting surface 27a of the ink emitting head 27, thereby cleaning the ink emitting surface 27a of the ink emitting head 27. This cleaning roll 28b is formed of a highly hygroscopic material, specifically, a sponge, a non-woven cloth or a woven cloth. Except during the printing operation, the head cap 28 closes the ink emitting surface 27a to prevent the ink 2 in the ink emitting head 27 from becoming dried.

The above-described head cartridge 3 includes, in addition to the above component parts, a residual quantity detection unit for detecting the residual quantity of the ink 2 in the ink tank 11, and a discriminating unit for discriminating the presence/absence of the ink 2 when the ink supplying unit 14 is connected to the connecting part 26.

Figure 7:
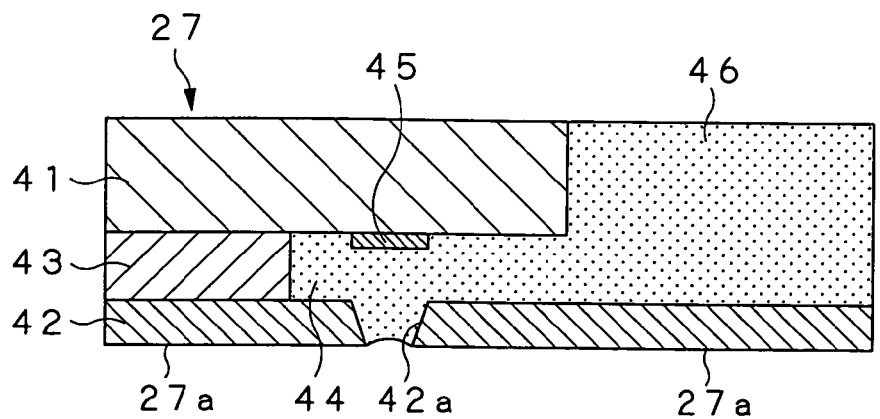
FIG. 7 is a cross-sectional view showing the structure of the ink emitting head.

Referring to FIG. 7, the ink emitting head 27 includes a printed circuit board 41, as a base, a nozzle sheet 42, provided with plural nozzles 42a, a film 43 for separating the printed circuit board 41 from the nozzle sheet 42 for each nozzle 42a, an ink liquid chamber 44 for pressurizing the ink 2 supplied via an ink duct 43, a resistance heater 45 for heating the ink 2 supplied to the ink liquid chamber 44, and an ink duct 46 for supplying the ink 2 to the ink liquid chamber 44.

The printed circuit board 41 forms a control circuit, formed by a logic IC (integrated circuit) or a driver transistor, on a semiconductor wafer, formed e.g. of silicon, and forms an upper surface of the ink liquid chamber 44.

The nozzle sheet 42 is a sheet material, with a thickness on the order of 10 to 15 μm, and is provided with the nozzle 42a, reduced in diameter towards the emitting surface 41, and having a diameter on the ink emitting surface 41 of the order of 20 μm. The nozzle sheet is arranged on the opposite side of the printed circuit board 41, with the film 43 in-between, for forming the lower surface of the ink liquid chamber 44.

The film 43 is a dry film resist cured on light exposure, for example, and is formed for surrounding each film 42a except the communicating area with the ink duct 43. The film 43 is interposed between the printed circuit board 41 and the nozzle sheet 42 for forming the lateral surface of the ink liquid chamber 44.

The ink liquid chamber 44, surrounded by the printed circuit board 41, nozzle sheet 42 and the film 43, forms a spacing for pressurizing the ink 2 supplied from the ink duct 43 from one nozzle 42a to the next.

The resistance heater 45 is arranged on the printed circuit board 41, facing the ink liquid chamber 44, and is electrically connected to e.g. a control circuit provided to the printed circuit board 41. The resistance heater 45 is heated under control by e.g. the control circuit to heat the ink 2 within the ink liquid chamber 44.

The ink duct 46 is connected to the ink effluent duct 34c of the connecting part 26 and is supplied with the ink 2 from the ink tank 11 connected to the connecting part 26 to supply the ink 2 to each ink liquid chamber 44 communicating with the ink duct 46. That is, the ink duct 46 communicates with the connecting part 26. Thus, the ink 2, supplied from the ink tank 11, flows into the ink duct 46 so as to be charged into the ink liquid chamber 44.

The above-described sole ink emitting head 27 is provided with the resistance heater 45, from one ink liquid chamber 44 to the next, and includes approximately 100 to 5000 ink liquid chambers 44, provided each with the resistance heater 45, from one color ink tank 11 to the next. In the ink emitting head 27, the resistance heaters 45 of the ink liquid chambers 44 are selectively heated, under a command from a controller 68 of the printer apparatus 1, as later explained, to emit the ink 2 in the ink liquid chamber 44, associated with the heated resistance heater 45, from the nozzle 42a, associated with the ink liquid chambers 44, in the from of ink liquid droplets i.

Figure 8A:
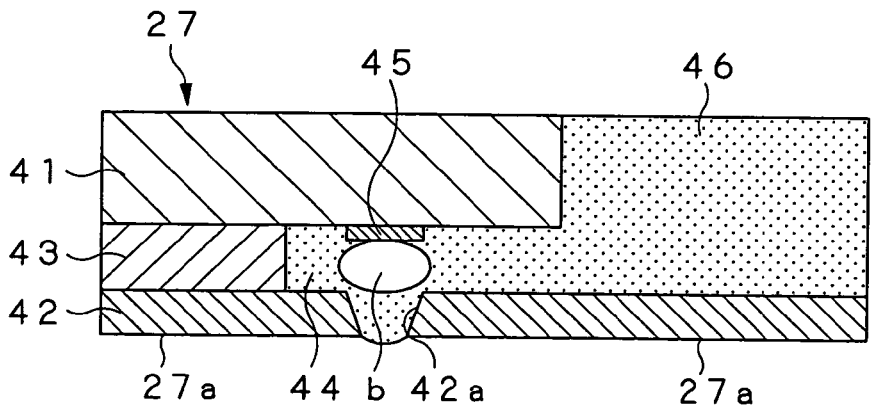
FIGS. 8A and 8B show the ink emitting head, where
Figure 8B:
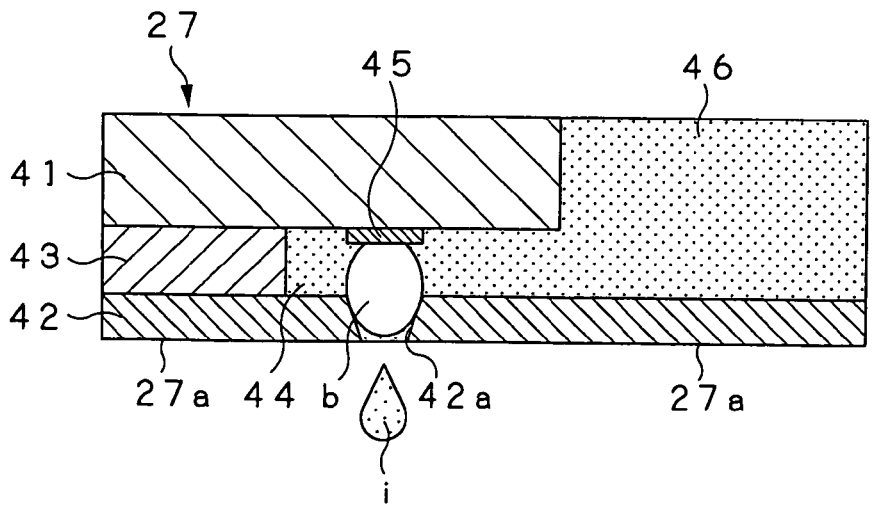

Specifically, with the ink emitting head 27, the control circuit of the printed circuit board 41 actuates the resistance heater 45, in a controlled manner, to supply the pulse current for e.g. 1 to 3 μsec to the selected resistance heater 45. By so doing, the resistance heater 45 of the ink emitting head 27 is heated quickly. Then, an air bubble b is generated in the ink 2 in the ink liquid chamber 44, contacting with the resistance heater 45, in the ink emitting head 27, as shown in FIG. 8A. In the ink emitting head 27, the air bubble b is expanded to pressurize the ink 2, with the extruded ink 2 being emitted as the ink liquid droplet i, as shown in FIG. 8B. After emission of the ink liquid droplet i, the ink 2 is supplied through the ink duct 43 into the ink liquid chamber 44, in the ink emitting head 27, so that the state prior to emission is again reached.

Meanwhile, the above-described ink emitting head 27 is formed by forming the film 43 on one major surface of the printed circuit board 41, in its entirety, shaping the film 43 in keeping with the ink liquid chamber 44, and by laminating the nozzle sheet 42 thereon.

With the above-described ink emitting head 27, the number of heating sites for the ink 2 is increased with the number of the resistance heaters 45, so that fine bubbles tend to be generated correspondingly. However, since the ink 2 contains the EO adducts of a dihydric alcohol having hydrocarbon groups with 9 or less carbon atoms and having the I/O ratio ranging between 1 and 1.37, it is possible to suppress fine bubbles from being produced in the ink 2 in the ink liquid chamber 44 to prevent emission troubles exemplified by non-emission or bent emission of the ink liquid droplet i.

Referring to the drawings, the main printer body unit 4, forming the printer apparatus 1, on which to mount the head cartridge 3, constructed as described above, will now be explained.

Figure 9:
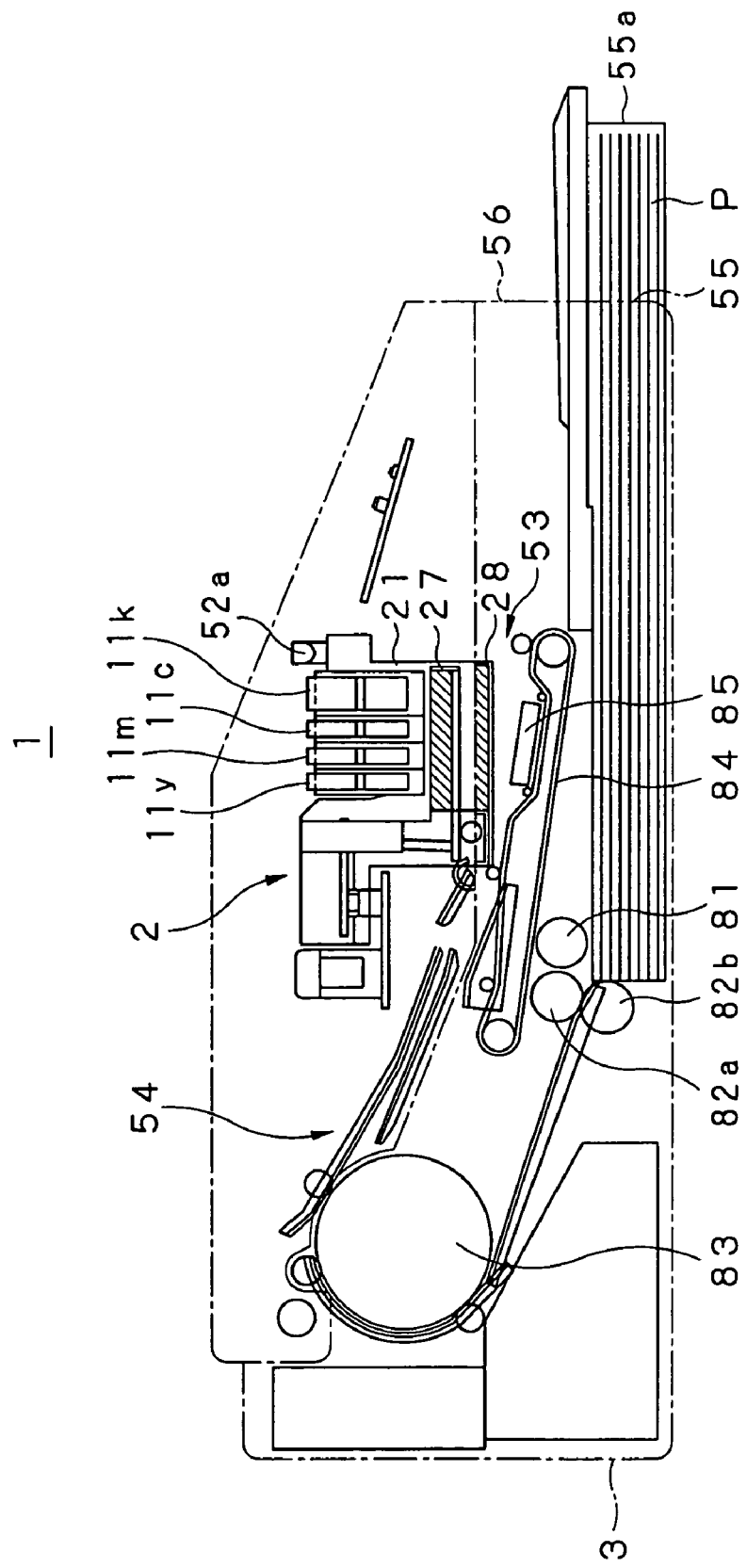
FIG. 9 is a partial see-through side view of the printer apparatus.

Referring to FIGS. 1 and 9, the main printer body unit 4 includes a head cartridge loading part 51, the head cartridge 3 is mounted to, a head cartridge holding mechanism 52 for holding and securing the head cartridge 3, a head cap opening/closing mechanism 53, a paper sheet supplying/discharging mechanism 54 for feeding/discharging the recording paper sheet P, a paper sheet feed port 55 for supplying the recording paper sheet P to the paper sheet supplying/discharging mechanism 54, and a paper sheet discharge port 56 for outputting the recording paper sheet P from the paper sheet supplying/discharging mechanism 54.

The head cartridge loading part 51 is a recess in which to load the head cartridge 3. The head cartridge 3 is loaded so that the ink emitting surface 27a of the ink emitting head 27 will be substantially parallel to the paper sheet surface of the recording paper sheet P, in order to effect printing on the running recording paper sheet P in keeping with the data. There are occasions where the head cartridge 3 needs to be exchanged due to ink clogging in the ink emitting head 27. Since the head cartridge 3 is a consumable commodity, even if it does not have to be exchanged so often as the ink tank 11, the head cartridge 3 is detachably held by the head cartridge holding mechanism 52 relative to the head cartridge 3.

The head cartridge holding mechanism 52 is used for detachably holding the head cartridge 3 on the head cartridge loading part 51, and is designed and constructed for holding and securing the head cartridge 3, with the head cartridge 3 pressuring against the reference surface 4a in the main printer body unit 4, with a knob 52a provided to the head cartridge 3 being retained in position by a biasing member, such as a spring, provided in a retention opening 52b of the main printer body unit 4.

The head cap opening/closing mechanism 53 includes a driving unit for opening/closing the head cap 28 of the head cartridge 3. For printing, the head cap 28 is opened for exposing the ink emitting head 27 to the recording paper sheet P and, when the printing is finished, the head cap 28 is closed to protect the ink emitting head 27.

The paper sheet supplying/discharging mechanism 54 includes a driving unit for transporting the recording paper sheet P. Specifically, the paper sheet supplying/discharging mechanism transports the recording paper sheet P, supplied from the paper sheet feed port 55, to the ink emitting head 27 of the head cartridge 3, and transports the recording paper sheet P, on which the ink liquid droplets i, supplied from the nozzles 42a, have been deposited, to effect the printing, to the paper sheet discharge port 56, to outside the apparatus. The paper sheet feed port 55 is an opening for supplying the recording paper sheet P to the paper sheet supplying/discharging mechanism 54, and is able to stock plural recording paper sheets P in stacked up state on e.g. a tray 55a. The paper sheet discharge port 56 is an opening through which the recording paper sheet P, on which the ink liquid droplets i have been deposited by way of printing, are discharged.

Figure 10:
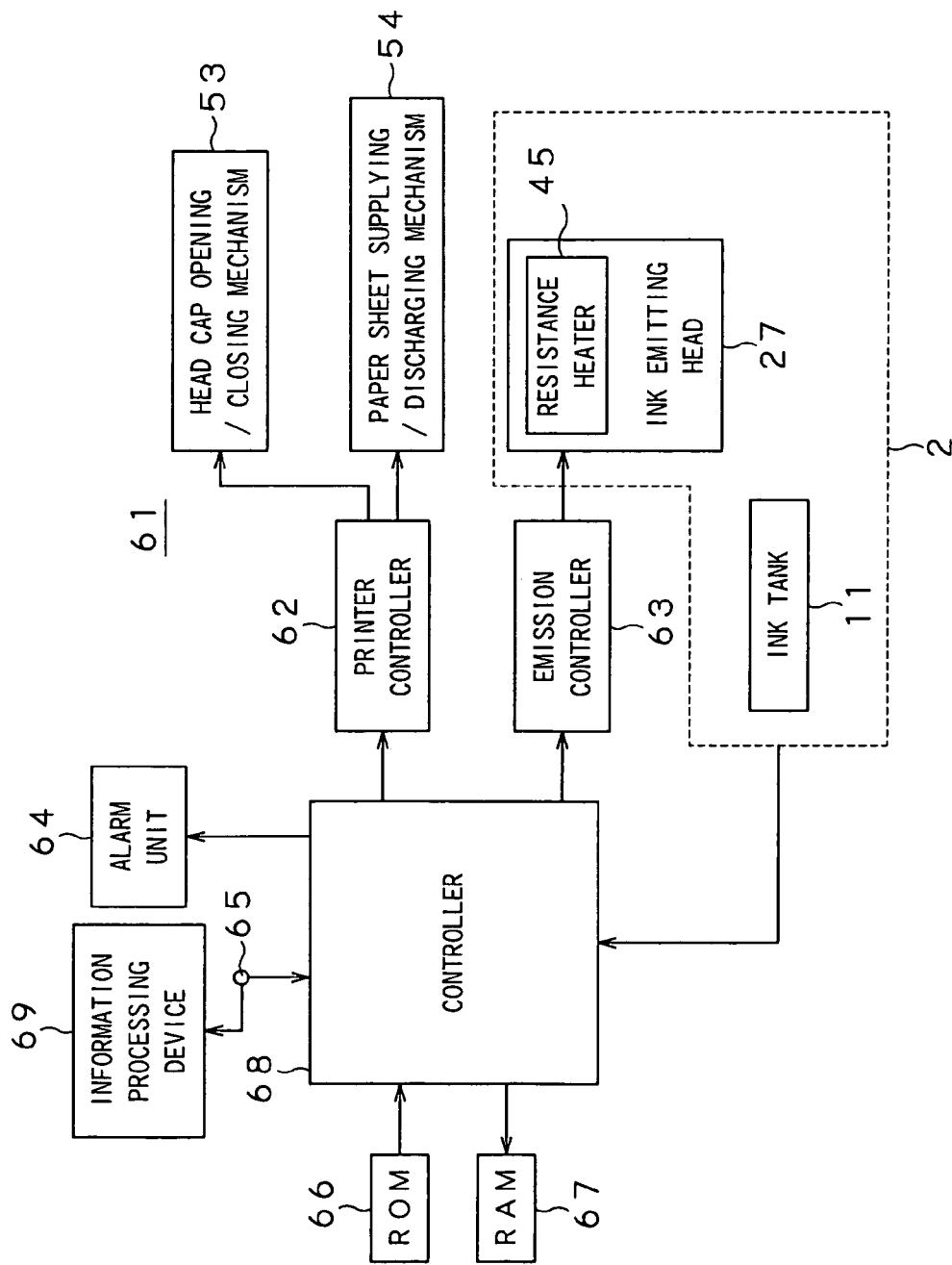
FIG. 10 is a schematic block diagram showing a control circuit of the printer apparatus.

A control circuit 61, shown in FIG. 10, for controlling the printing by the printer apparatus, designed and constructed as described above, will now be explained with reference to the drawings.

The control circuit 61 includes a printer controller 62 for controlling the driving of the head cap opening/closing mechanism 53 and the paper sheet supplying/discharging mechanism 54 of the main printer body unit 4, an emission controller 63 for controlling e.g. the current supplied to the ink emitting head 27, associated with each color of the ink i, an alarm unit 64 for indicating the residual quantity of the ink i of each color, an input/output terminal 65 for inputting/outputting signals for an external apparatus, a ROM (Read Only Memory) 66 having recorded thereon e.g. a control program, a RAM (Random Access Memory) 67 for transiently recording e.g. a read-out control program and reading out the so recorded control program as necessary, and a controller 68 for controlling various components.

The printer controller 62 actuates a driving motor of the head cap opening/closing mechanism 53, based on a control signal from the controlling 68, in order to control the head cap opening/closing mechanism for opening/controlling the head cap 28. The printer controller 62 also actuates a driving motor of the paper sheet supplying/discharging mechanism 54, based on a control signal from the controlling 68, in order to control the paper sheet supplying/discharging mechanism 54 to feed the recording paper sheet P from the paper sheet feed port 55 of the main printer body unit 4 to discharge the printed paper sheet P from the paper sheet discharge port 56 after printing.

The emission controller 63 is an electrical circuit including, for example, a switching element for on/off controlling the electrical connection to an external power supply supplying the pulse current to the resistance heater 45, provided to the ink emitting head 27, a resistor for adjusting the value of the pulse current supplied to the resistance heater 45, and a control circuit for controlling the on/off switching of e.g. switching elements. The emission controller 63 adjusts the pulse current e.g. supplied to the resistance heater 45 provided to the ink emitting head 27 to control the ink emitting head 27 adapted for emitting the ink i from the nozzles 42a.

The alarm unit 64 is a display means, such as LCD (liquid crystal display), and demonstrates the information exemplified by printing conditions, printing states or residual ink quantities. The alarm unit 64 may also be a voice outputting means, such as a loudspeaker, in which case the information such as the printing conditions, printing states or the residual ink quantities is output by voice. The alarm unit 64 may include the display means and the voice outputting means in combination. The alarm may be issued by, for example a monitor or a loudspeaker of an information processing device 69.

The input/output terminal 65 sends the information, such as the printing conditions, printing states or the residual ink quantities, over an interface to e.g. the external information processing device 69. The input/output terminal 65 is also supplied from e.g. the information processing device 69 with printing data or with control signals for outputting the information exemplified by the above-mentioned printing conditions, printing states or the residual ink quantities. The information processing device 69 is an information processing device exemplified by e.g. a personal computer or a PDA (Personal Digital Assistant).

The input/output terminal 65, connected to e.g. the information processing device 69, may use e.g. a serial parallel interface or a parallel interface, and is specifically pursuant to standards, such as USB (Universal Serial Bus), RS (Recommended Standard) 232C or IEEE (Institute of Electrical and Electronic Engineers) 1394. The input/output terminal 65 may have data communication, by a wired or wireless route, with the information processing device 69. Among the standards for wireless communication, there are, for example, the IEEE802.11a, 802.11b and 802.11g.

Between the input/output terminal 65 and the information processing device 69, there may be interposed a network, such as the Internet. The input/output terminal 65 is connected in this case to a network, exemplified by LAN (Local Area Network), ISDN (Integrated Services Digital Network), xDSL (Digital Subscriber Line), FTHP (Fiber to the Home), CATV (Community Antenna TeleVision) or BS (Broadcasting Satellite), and data communication is carried out in association with various protocols, such as TCP/IP (Transmission Control Protocol/Internet Protocol).

The ROM 66 is a memory, such as EP-ROM (Erasable Programmable Read-Only Memory), having stored therein a program for various processing operations carried out by the controller 68. This stored program is loaded by the controller 68 to the RAM 67. The RAM 67 stores the program as read out from the ROM 66 by the controller 68 or various states of the printer apparatus 1.

The controller 68 controls various parts based e.g. on printing data supplied from the input/output terminal 65 and on data of the residual quantity of the ink 2, supplied from the head cartridge 3. The controller 68 reads out a processing program, controlling the various parts, based e.g. on the input control signal, from the ROM 66, for storage in the RAM 67, to control or process various parts based on this processing program.

In the above-described control circuit 61, the processing program is stored in the ROM 66. However, the program storage medium is not limited to the ROM 66, such that a variety of other recording mediums, such as an optical disc, a magnetic disc, an MO disc or an IC card, having the processing program recorded thereon, may also be used. In this case, the control circuit 61 is connected to drives for actuating the recording mediums either directly or through the information processing device 69 for reading out the processing program from these recording mediums.

Figure 11:
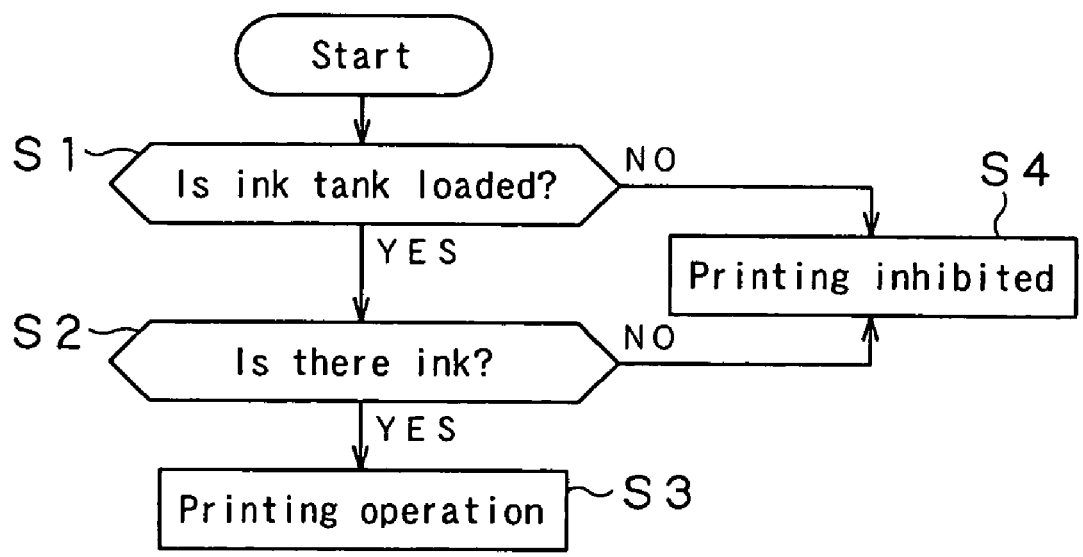
FIG. 11 is a flowchart showing the printing operation of the printer apparatus.

The printing operation by the printer apparatus 1 will now be explained with reference to a flowchart shown in FIG. 11. It is noted that the present operation is carried out by processing operations by a CPU (central processing unit), not shown, provided in the controller 68, based on a processing program stored in a memory, such as ROM 66.

First, a user issues a command, by acting e.g. on an operating panel provided on the main printer body unit 4, in order for the printer apparatus 1 to carry out the printing operation. Then, in a step S1, the controller 68 verifies whether or not the ink tank 11 of a preset color has been loaded on each loading part 22. If the ink tanks 11 of proper colors are mounted on all of the loading zones 22, the controller 68 proceeds to a step S2 and, if otherwise, the controller 68 proceeds to a step S4 to inhibit the printing operation.

The controller 68 in the step S2 verifies whether or not the quantity of the ink 2 in the ink tank 11 is less than a predetermined quantity, that is, whether or not the ink tank 11 is in the ink-depleted state. If it is determined that the ink tank 11 is in the ink-depleted state, the alarm unit 64 issues an alarm to that effect and, in the step S4, the printing operation is inhibited. If conversely the quantity of the ink 2 in the ink tank 11 is above the predetermined value, that is, the ink tank is charged with the ink, the printing operation is permitted in a step S3.

Figure 12:
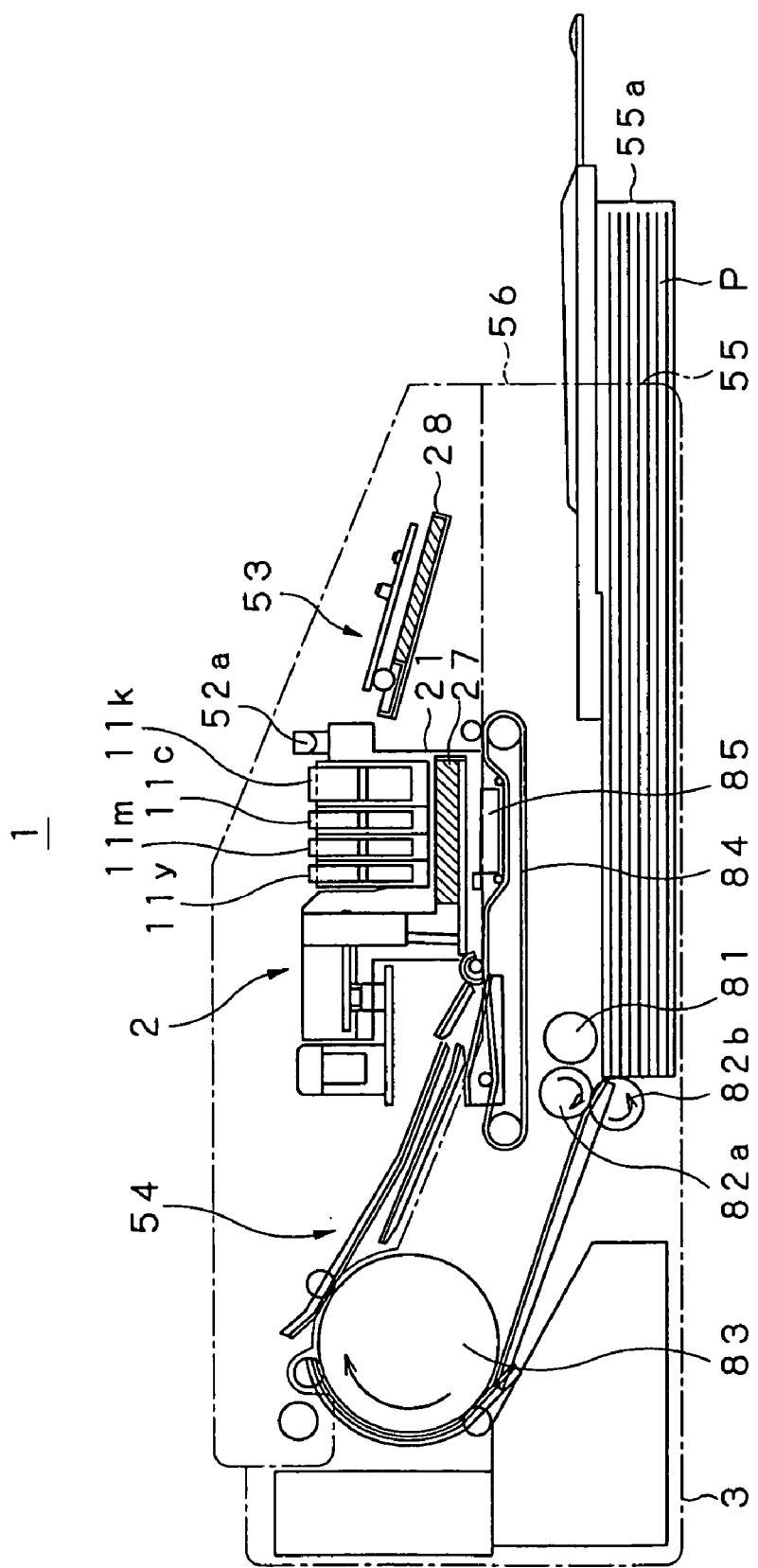
FIG. 12 is a partial see-through side view of the printer apparatus, shown with a head cap opened.

For carrying out the printing operation, the controller 68 causes the driving units 53, 54 to be driven in a controlled manner, by the printer controller 62, to shift the recording paper sheet P to a printing enabling position. Specifically, the controller 68 causes the actuation of the driving motor, forming the head cap opening/closing mechanism 53, to cause movement of the head cap 28 towards the tray 55a with respect to the head cartridge 3, to expose the nozzles 42a of the ink emitting head 27, as shown in FIG. 12. The controller 68 causes the driving of the driving motor, forming the paper sheet supplying/discharging mechanism 54, to cause the feed movement of the recording paper sheet P. Specifically, the controller 68 controls the paper sheet supplying/discharging mechanism 54 in such a manner that the recording paper sheet P is pulled out from the tray 55a by a paper sheet feed roll 81, the recording paper sheet P, thus pulled out, is transported by paired separating rolls 82a, 82b, rotating in opposite directions, to a direction reversing roll 83 to reverse the transport direction, the recording paper sheet P then is transported to a transport belt 84, and the recording paper sheet P, thus transported, is held at a preset position by retention means 85, to determine the position of deposition of the ink 2.

The controller 68 then controls the ink emitting head 27 by the emission controller 63 and causes the ink liquid droplet i to be emitted and deposited via nozzles 42a on the recording paper sheet P, transported to the printing position, to record an image or a letter/character formed by ink dots.

Since the ink 2 contains an EO adduct of a dihydric alcohol, having a hydrocarbon group with 9 or less carbon atoms and having an I/O ratio ranging between 1 and 1.37, it is possible in the ink emitting head 27 to suppress fine bubbles from being generated in the ink 2 charged into the ink liquid chamber 44, in such a manner as to prevent emission troubles, such as non-emission or warped emission of the ink liquid droplet i. Moreover, since the ink liquid droplet i deposited contains the EO adduct of a dihydric alcohol, having a hydrocarbon group with 9 or less carbon atoms and having an I/O ratio ranging between 1 and 1.37, the image or the letter/character is of a high quality with high optical density and suffers from boundary bleeding or generation of speckled mixed colors in all-over printing only to a lesser extent.

When the ink liquid droplet i has been emitted from the nozzles 42a, the same quantity of the ink 2 as that emitted as the ink liquid droplet i is instantly replenished into the ink liquid chamber 44 from the ink duct 46, so that the original state is restored, as shown in FIG. 6B. When the ink liquid droplet i is emitted from the ink emitting head 27, such that the negative pressure of the ink 2 in the portion of the ink chamber 34b towards the ink effluent duct 34c with respect to the opening 34d is increased, the diaphragm 34i is uplifted by atmospheric pressure under the negative pressure of the ink 2, along with the valve shaft 34h, to uplift the valve 34e, which has so far kept the opening 34d of the ink chamber 34b closed under the bias of the biasing member 34f and the diaphragm 34i, against the bias of the biasing member 34f, as shown in FIG. 6A. The opening 34d between the ink inlet duct 34a and the ink inlet duct 34a of the ink chamber 34b is opened at this time to supply the ink 2 from the ink inlet duct 34a side to the ink effluent duct 34c side to replenish the ink 2 to the ink duct 46 of the ink emitting head 27. The negative pressure of the ink 2 is then decreased so that the diaphragm 34i is reset to its original shape by the restoring force, with the valve 34e then being lowered, along with the valve shaft 34h, such as to close the ink chamber 34b. Thus, with the valving mechanism 34, the above-described operation is repeated each time the ink liquid droplet i is emitted to raise the negative pressure of the ink 2.

With the ink emitting head 27, since the ink 2 contains the EO adduct of a dihydric alcohol having hydrocarbon groups with 9 or less carbon atoms and having the I/O ratio ranging between 1 and 1.37, it is possible to suppress fine bubbles from being produced in the ink 2 in the ink liquid chamber 44, even when the ink 2 is repeatedly supplied as described above, that is, when the ink 2 is repeatedly supplied through a flow duct of a complex profile. Thu, the ink 2 free from fine bubbles may be delivered to the ink emitting head 27 to prevent emission troubles exemplified by non-emission or bent emission of the ink liquid droplet i.

Consequently, the letter/character or an image consistent with printing data may be printed with superior quality on the recording paper sheet P being fed by the paper sheet supplying/discharging mechanism 54. The recording paper sheet P, on which printing has been made as described above, is then discharged via paper sheet discharge port 56 by the paper sheet supplying/discharging mechanism 54.

With the above-described printer apparatus 1, in which the ink 2, containing the EO adduct of a dihydric alcohol, having a hydrocarbon group with 9 or less carbon atoms and having an I/O ratio ranging between 1 and 1.37, as surfactant, is contained in the ink tank 11, with the ink 2 being emitted as ink liquid droplet i from the nozzles 42a, it is possible to suppress fine bubbles from being produced in the ink 2 to prohibit emission troubles, with the result that the image is free from blurring or white spots and hence there may be obtained high-quality printed image or letter/character.

With the present printer apparatus 1, in which the ink containing the EO adduct of a dihydric alcohol, having a hydrocarbon group with 9 or less carbon atoms and having an I/O ratio ranging between 1 and 1.37, as surfactant, is deposited on the recording paper sheet P, for printing thereon, it is possible to effect printing of an image of high quality and high optical density, suppressed in boundary bleeding or speckled color mixing in all-over printing.

With the above-described head cartridge 3, the ink tank 11 may be mounted to or dismounted from the main cartridge body unit 21. However, the present invention is not limited to this configuration. That is, since the head cartridge 3 itself is a consumable item and may be mounted to or dismounted from the main printer body unit 4, the ink tank 11 may be mounted as one with the main cartridge body unit 21.

In the above-described embodiment, the present invention is directed to a printer apparatus. However, the present invention is not limited to this configuration and may broadly be applied to other liquid emitting apparatus, such as facsimile machine, copying machine, an emitting apparatus for DNA chips in the liquid (see Japanese laid-Open Patent Publication 2002-34560) or to a liquid emitting apparatus for emitting a liquid containing electrically conductive particles for forming a wiring pattern for an printed circuit board.

In the foregoing, the ink emitting head 27, in which the ink 2 is heated by the sole resistance heater 45, and the ink so heated is emitted, is taken as an example for explanation. However, the present invention is not limited to this configuration and may also be applied to a liquid emitting apparatus provided with emitting means having plural pressure generating elements each of which delivers discrete values or the energy at different timings to control the liquid emitting direction.

Moreover, in the foregoing, such an electro-thermal conversion system, in which the ink 2 is emitted from the nozzles 42a as the ink is heated by the sole resistance heater 45, is used. This is merely illustrative and such an electro-mechanical conversion system may also be used in which the ink is emitted electromechanically from the nozzle by an electromechanical conversion element exemplified by a piezoelectric element.

In addition, in the foregoing, a line-based printer apparatus 1 has been explained. The present invention is not limited to this configuration and may also be applied to a serial-based liquid emitting apparatus in which the ink head is moved in a direction substantially at right angles to the traveling direction of the recording paper sheet P.

EXAMPLE

The present invention will now be explained with reference to samples of an ink actually prepared as a recording liquid embodying the present invention.

Sample 1

In the sample 1, a magenta-based ink was first prepared. For preparing the magenta-based ink, 3 mass wt % of C.I. Acid red, as a colorant, 75 mass wt % of water, as a solvent, 10 mass wt % of glycerin, as another solvent, 5 mass wt % of 1,3-butanediol, as another solvent, 5 mass wt % of neopentyl glycol, as yet another solvent, and 1.5 mass wt % of the compound shown by the above chemical formula 4, were mixed together and filtered by a membrane filter, with a pore size of 0.22 μm (trade name: Millex-0.22), to prepare a magenta-based ink.

Then, a cyan-based ink was prepared. For preparing the cyan-based ink, 2.5 mass wt % of C.I. Direct Blue, as a colorant, 76 mass wt % of water, as a solvent, 10 mass wt % of glycerin, as another solvent, 5 mass wt % of 1,3-butanediol, as another solvent, 5 mass wt % of neopentyl glycol, as yet another solvent, and 1.5 mass wt % of the compound shown by the above chemical formula 4, as a surfactant, were mixed together and filtered by a membrane filter, with a pore size of 0.22 μm (trade name: Millex-0.22), to prepare a cyan-based ink.

Thus, in the sample 1, a magenta-based ink and a cyan-based ink, each containing an EO adduct of a dihydric alcohol, having a hydrocarbon group with 8 carbon atoms and having an I/O ratio of 1.04, as shown by the chemical formula 4, as the surfactant, were prepared.

Sample 2

With the sample 2, a magenta-based ink and a cyan-based ink were prepared in the same way as with the sample 1, except that the amount of addition of the EO adduct of a dihydric alcohol, shown by the chemical formula 4, as a surfactant, was set to 1 wt %.

Sample 3

With the sample 3, a magenta-based ink and a cyan-based ink were prepared in the same way as with the sample 1, except that the amount of addition of the EO adduct of a dihydric alcohol, shown by the chemical formula 4, as a surfactant, was set to 0.5 wt %.

Sample 4

With the sample 4, a magenta-based ink and a cyan-based ink were prepared in the same way as with the sample 1, except that an EO adduct of a dihydric alcohol, having a hydrocarbon group with 8 carbon atoms and having an I/O ratio of 1.24, as shown by the chemical formula 5, was used as a surfactant, in place of the organic compound shown by the chemical formula 4.

Sample 5

With the sample 5, a magenta-based ink and a cyan-based ink were prepared in the same way as with the sample 1, except that an EO adduct of a dihydric alcohol, having a hydrocarbon group with 8 carbon atoms and having an I/O ratio of 1.37, as shown by the chemical formula 6, was used as a surfactant, in place of the organic compound shown by the chemical formula 4.

Sample 6

With the sample 6, a magenta-based ink and a cyan-based ink were prepared in the same way as with the sample 1, except that an EO adduct of a dihydric alcohol, having a hydrocarbon group with 6 carbon atoms and having an I/O ratio of 1.26, as shown by the chemical formula 7, was used as a surfactant, in place of the organic compound shown by the chemical formula 4.

Sample 7

With the sample 7, a magenta-based ink and a cyan-based ink were prepared in the same way as with the sample 1, except that an EO adduct of a dihydric alcohol, having a hydrocarbon group with 7 carbon atoms and having an I/O ratio of 1.2, as shown by the chemical formula 9, was used as a surfactant, in place of the organic compound shown by the chemical formula 4.

Sample 8

With the sample 8, a magenta-based ink and a cyan-based ink were prepared in the same way as with the sample 1, except that an EO adduct of a dihydric alcohol, having a hydrocarbon group with 9 carbon atoms and having an I/O ratio of 1, as shown by the chemical formula 11, was used as a surfactant, in place of the organic compound shown by the chemical formula 4.

Sample 9

With the sample 9, a magenta-based ink and a cyan-based ink were prepared in the same way as with the sample 1, except that an EO adduct of a dihydric alcohol, having a hydrocarbon group with 8 carbon atoms and having an I/O ratio of 1.1, as shown by the chemical formula 13, was used as a surfactant, in place of the organic compound shown by the chemical formula 4.

Sample 10

With the sample 10, a magenta-based ink and a cyan-based ink were prepared in the same way as with the sample 1, except that an EO adduct of a dihydric alcohol, having a hydrocarbon group with 9 carbon atoms and having an I/O ratio of 1.04, as shown by the chemical formula 15, was used as a surfactant, in place of the organic compound shown by the chemical formula 4.

Sample 11

With the sample 11, a magenta-based ink and a cyan-based ink were prepared in the same way as with the sample 1, except that no EO adduct of a dihydric alcohol was added.

Sample 12

With the sample 12, a magenta-based ink and a cyan-based ink were prepared in the same way as with the sample 1, except that an EO adduct of a dihydric alcohol, shown by the chemical formula 17, was used in place of the organic compound shown by the chemical formula 4.

[Chemical formula 14]

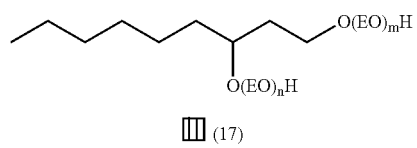

(17)

where m + n = 2.

Sample 13

With the sample 13, a magenta-based ink and a cyan-based ink were prepared in the same way as with the sample 1, except that an EO adduct of a dihydric alcohol, shown by the chemical formula 18, was used in place of the organic compound shown by the chemical formula 4.

[Chemical formula 15]

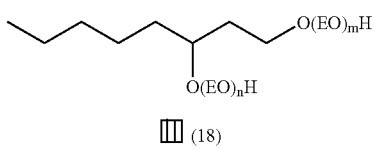

(18)

where m + n = 7.

Sample 14

With the sample 12, a magenta-based ink and a cyan-based ink were prepared in the same way as with the sample 1, except that an EO adduct of a dihydric alcohol, shown by the chemical formula 19, was used in place of the organic compound shown by the chemical formula 4.

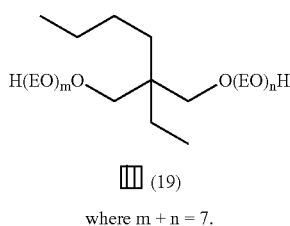

[Chemical formula 16]

(19)

where m + n = 7.

Sample 15

With the sample 15, a magenta-based ink and a cyan-based ink were prepared in the same way as with the sample 1, except that an EO adduct of a dihydric alcohol, shown by the chemical formula 20, was used in place of the organic compound shown by the chemical formula 4.

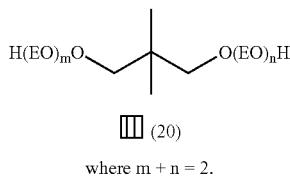

[Chemical formula 17]

(20)

where m + n = 2.

Sample 16

With the sample 16, a magenta-based ink and a cyan-based ink were prepared in the same way as with the sample 1, except that an EO adduct of a dihydric alcohol, shown by the chemical formula 21, was used in place of the organic compound shown by the chemical formula 4.

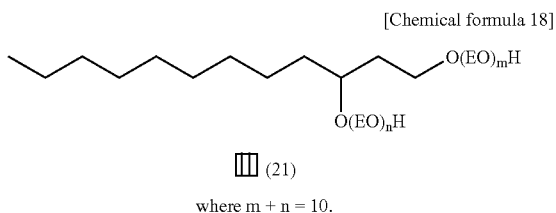

[Chemical formula 18]

(21)

where m + n = 10.

The inorganic value (IO), organic value (OV) and I/O, for the EO adducts of a dihydric alcohol, shown in the above chemical formulas 17 to 21, are shown in the following Table 2.

TABLE 2

| EO adduct of a dihydric alcohol | Inorganic value (IV) | Organic value (OV) | I/O |
|---|---|---|---|
| Chemical formula 17 | 240 | 250 | 0.96 |
| Chemical formula 18 | 540 | 380 | 1.42 |
| Chemical formula 19 | 540 | 390 | 1.38 |
| Chemical formula 20 | 240 | 160 | 1.50 |
| Chemical formula 21 | 720 | 550 | 1.31 |

It will be seen from table 2 that the EO adducts of dhhydric alcohol, shown by the chemical formulas 17 to 20, are deviated from the range of I/O from 1 to 1.37. Thus, if the EO adduct of dhhydric alcohol, shown by the chemical formula 17, is contained in the ink, the resultant ink is lowered in hydrophilicity, with the EO adduct being separated in the ink to stop up the nozzle as oil droplets to deteriorate emission stability. On the other hand, if the EO adducts of dhhydric alcohol of the chemical formulas 18 to 20, with the I/O exceeding 1.37, are contained in the ink, the resultant ink is lowered in hydrophilicity, whilst fine bubbles tend to be generated in the ink to deteriorate the emission stability.

For the magenta-based and cyan-based inks of the respective samples, evaluation was made of emission stability, intermittent emission stability, optical density, boundary bleeding and speckled color mixing in all-over printing.

Meanwhile, emission stability was evaluated as follows: The inks of the respective samples were charged into respective ink tanks and mounted on the head cartridge. After emitting the inks by the line-based ink jet printer apparatus, the head cartridge was transiently dismounted from the ink jet printer apparatus and was preserved in an atmosphere of the temperature of 10° C. and the relative humidity of 50% for five days and then in an atmosphere of the temperature of 40° C. and the relative humidity of 50% for five days so as to be exposed to an environment of the temperature of 20° C. and the relative humidity of 50%. The head cartridge was then mounted again on the line-based ink jet printer apparatus and a preset area of a copy paper sheet manufactured by RICOH (trade name: My Paper) was coated in its entirety, from one color to the next, by way of a so-called all-over printing. The ink tanks were then dismounted from the head cartridge and visual check was then conducted as to whether or not fine bubbles have not been generated in the ink emission head. The image printed was also visually checked.

The intermittent emission stability was evaluated by the following method. The inks of respective samples were charged in ink tanks which were then loaded on the head cartridge. The inks were emitted by a line-based ink jet printer apparatus and the head cartridge was transiently dismounted from the ink jet printer apparatus. With the emitting surface of the head cartridge exposed to outside, the head cartridge was allowed to stand stationarily for seven minutes at a temperature of 30° C. and an RH of 10%. The head cartridge was then mounted on the line-based ink jet printer apparatus and all-over printing was then carried out for each color on copy sheets manufactured by RICOH (trade name: MyPaper). A visual check was then conducted of the printed images.

The optical density was measured by the following method. The inks of the respective samples were charged in the ink tanks and loaded on the head cartridge. All-over printing was then carried out for each color on copy sheets manufactured by RICOH (trade name: MyPaper) and reflection optical density was measured by an optical density meter, manufactured by MACBETH (trade name: TR924).

The boundary bleeding was measured by the following method. The inks of the respective samples were charged in the ink tanks and loaded on the head cartridge. Then, all-over printing was carried out for each color on copy sheets manufactured by RICOH (trade name: MyPaper), with the respective colors lying adjacent to one another. The bleeding state at the boundaries of the colors in the printed image was then visually checked.

Evaluation of speckled color mixing in all-over printing was evaluated by the following method. The ink samples were charged in the respective ink samples and loaded on the head cartridge. All-over printing was carried out with blue color several times so that the blue color of each printing will overlap and the evenness of the blue color density, that is, the possible presence of irregular color, in the printed image, was visually checked.

The emission stability, intermittent emission stability, optical density, boundary bleeding and speckled color mixing in all-over printing for the respective samples are shown in the following Table 3:

minor quantity of bleeding for each color at the boundary, a symbol ◻ indicates that there is bleeding of each color on the boundary degrading the image quality and a symbol x indicates that that there is bleeding of each color on the entire boundary significantly degrading the image quality. As for speckled color mixing in all-over printing in Table 3, a symbol ◉ indicates that an image printed all-over to a blue color is completely free from color irregularities, a symbol

TABLE 3

| | EO adduct of dihydric alcohol | | | | | | | | |
|---|---|---|---|---|---|---|---|---|---|
| | Sort | I/O | Number of C atoms of hydrocarbon group | Sort of hydrocarbon group | Emission stability | Intermittent emission stability | Optical density | Boundary bleeding | Color mixing in allover printing |
| Sample 1 | Chemical formula 4 | 1.04 | 8 | Straight-chained | ◻ | ◻ | 1.12 | ◻ | ◻ |
| Sample 2 | Chemical formula 4 | 1.04 | 8 | Straight-chained | ◻ | ◻ | 1.21 | ◉ | ◉ |
| Sample 3 | Chemical formula 4 | 1.04 | 8 | Straight-chained | ◻ | ◻ | 1.15 | ◻ | ◻ |
| Sample 4 | Chemical formula 5 | 1.24 | 8 | Straight-chained | ◻ | ◻ | 1.15 | ◻ | ◻ |
| Sample 5 | Chemical formula 6 | 1.37 | 8 | Straight-chained | ◻ | ◻ | 1.14 | ◻ | ◻ |
| Sample 6 | Chemical formula 7 | 1.26 | 6 | Straight-chained | ◻ | ◻ | 1.15 | ◻ | ◻ |
| Sample 7 | Chemical formula 9 | 1.20 | 7 | Branched | ◉ | ◻ | 1.23 | ◉ | ◉ |
| Sample 8 | Chemical formula 11 | 1 | 9 | Branched | ◉ | ◻ | 1.23 | ◉ | ◉ |
| Sample 9 | Chemical formula 13 | 1.10 | 8 | Branched | ◉ | ◻ | 1.23 | ◉ | ◉ |
| Sample 10 | Chemical formula 15 | 1.04 | 9 | Branched | ◉ | ◉ | 1.24 | ◉ | ◉ |
| Sample 11 | — | — | — | — | X | Δ | 1.01 | X | X |
| Sample 12 | Chemical formula 17 | 0.96 | 9 | Straight-chained | ◻ | Δ | 1.1 | Δ | ◻ |
| Sample 13 | Chemical formula 18 | 1.42 | 8 | Straight-chained | X | Δ | 1.1 | Δ | Δ |
| Sample 14 | Chemical formula 19 | 1.38 | 9 | Branched | ◻ | Δ | 1.19 | Δ | ◻ |
| Sample 15 | Chemical formula 20 | 1.5 | 5 | Branched | X | Δ | 1.2 | Δ | Δ |
| Sample 16 | Chemical formula 21 | 1.31 | 12 | Straight-chained | Δ | Δ | 1.11 | Δ | Δ |

As for emission stability in Table 3, a symbol ◉ indicates that there are no white spots in the entire image and that no fine bubbles are generated in the ink in the ink emission head, a symbol ◻ indicates that the image quality is not of a problem but there is slight white spot in the image and a minor quantity of bubbles are generated in the ink in the ink emission head, a symbol Δ indicates that a minor quantity of bubbles are generated in the ink in the ink emission head, and a symbol x indicates that there is white spot responsible for degrading the image quality and a large quantity of fine bubbles are generated in the ink in the ink emission head. As for intermittent emission stability in Table 3, a symbol ◻ indicates that the image is clear and free of blurring, a symbol ◻ indicates that the image suffers from slight blurring and a symbol X indicates that the entire image is blurred and the image quality is severely degraded. As for boundary bleeding in Table 3, a symbol ◉ indicates that there is no bleeding of each color at the boundary, a symbol ◻ indicates that image quality is not of a problem but that there is a ◻ indicates that the image quality is not of a problem but the image suffers from color irregularities, even though to a lesser extent, and a symbol x indicates that the entire image suffers from color irregularities such that the image quality is deteriorated significantly.

It may be seen from the results of evaluation shown in Table 3 that, as compared to the sample 11 not containing the EO adduct of a dihydric alcohol, the samples 12 to 15 with the I/O off the range of 1 to 1.37 or to the sample containing an EO adduct of a dihydric alcohol having a hydrocarbon group with 12 carbon atoms, the samples 1 to 10 containing an EO adduct of a dihydric alcohol, having a hydrocarbon group with 9 or less carbon atoms and having an I/O ratio ranging between 1 and 1.37 are not of a problem in the image quality in the evaluation of emission stability, intermittent emission stability, boundary bleeding and speckled color mixing in all-over printing, while being superior in optical density.

With the samples 1 to 16, not containing an EO adduct of a dihydric alcohol, having a hydrocarbon group with 9 or less carbon atoms and having an I/O ratio ranging between 1 and 1.37, it becomes difficult to suppress fine air bubbles from being generated in the ink emitting head, while emission defects, such as non-emission or warped emission, as well as white spots or blurring, are produced to deteriorate the image quality. Moreover, with the samples 1 to 16, not containing an EO adduct of a dihydric alcohol, having a hydrocarbon group with 9 or less carbon atoms and having an I/O ratio ranging between 1 and 1.37, it becomes difficult to raise the optical density of the image or to suppress generation of boundary bleeding or speckled color mixing in all-over printing, such that no image of high image quality can be produced.

With the samples 1 to 10, containing the EO adduct of a dihydric alcohol, having a hydrocarbon group with 9 or less carbon atoms and having an I/O ratio ranging between 1 and 1.37 in contradistinction from the above samples 11 to 16, fine bubbles can be suppressed from being produced in the ink emission head, such that the nozzles may be prevented from being stopped with these fine bubbles to prevent emission troubles, with the result that the image printed may be free from white spots or blurring and of high quality. With the samples 1 to 10, containing the EO adduct of a dihydric alcohol, having a hydrocarbon group with 9 or less carbon atoms and having an I/O ratio ranging between 1 and 1.37, an image printed may be of high image quality, being superior in optical density and suppressed in boundary bleeding or in speckled color mixing in all-over printing.

It may be seen from above that addition of the EO adduct of a dihydric alcohol, having a hydrocarbon group with 9 or less carbon atoms and having an I/O ratio ranging between 1 and 1.37, to the ink being prepared, is crucial in producing the ink of high quality superior in emission stability, intermittent emission stability and in optical density and which is suppressed in boundary bleeding and in speckled color mixing in all-over printing.

It will also be seen from the results of evaluation of Table 3 that, with the samples 7 to 10, the emission stability is improved further. The reason is that the EO adducts of a dihydric alcohol, represented by the chemical formulas 9, 11, 13 and 15, as used for the samples 7 to 10, contain branched hydrocarbon groups, with the steric chemical structure of the a dihydric alcohol acting for further suppressing the generation of fine bubbles in the ink.

It may be seen from this that use of an EO adduct of a dihydric alcohol, having a branched hydrocarbon group, as an EO adduct of a dihydric alcohol, having a hydrocarbon group with 9 or less carbon atoms and having an I/O ratio ranging between 1 and 1.37, is crucial in the preparation of the ink having superior emission stability.

Measurement was then made of the dynamic surface tension of the inks of the respective samples. The measured results of the dynamic surface tension of the respective ink samples 1 to 16 are shown in Table 4.

TABLE 4

| | EO adduct of a dihydric alcohol | Sort of ink | Dynamic surface tension (mN/m) | |
|---|---|---|---|---|
| | | | $\sigma_{20}$ | $\sigma_1$ |
| Sample 1 | Chemical formula 4 | Magenta | 29.5 | 28 |
| | | cyan | 29.1 | 27.3 |
| Sample 2 | Chemical formula 4 | Magenta | 34.1 | 31.1 |
| | | cyan | 34 | 30.5 |
| Sample 3 | Chemical formula 4 | Magenta | 38 | 35.5 |
| | | cyan | 37.9 | 35 |

TABLE 4-continued

| | EO adduct of a dihydric alcohol | Sort of ink | Dynamic surface tension (mN/m) | |
|---|---|---|---|---|
| | | | $\sigma_{20}$ | $\sigma_1$ |
| Sample 4 | Chemical formula 5 | Magenta | 38.2 | 36.1 |
| | | cyan | 37.5 | 35 |
| Sample 5 | Chemical formula 6 | Magenta | 39 | 36.8 |
| | | cyan | 38.6 | 36.4 |
| Sample 6 | Chemical formula 7 | Magenta | 37.8 | 34.7 |
| | | cyan | 37 | 34.2 |
| Sample 7 | Chemical formula 9 | Magenta | 36.8 | 34.5 |
| | | cyan | 36.2 | 34 |
| Sample 8 | Chemical formula 11 | Magenta | 39.5 | 37.7 |
| | | cyan | 39 | 37 |
| Sample 9 | Chemical formula 13 | Magenta | 40 | 38.5 |
| | | cyan | 39.2 | 38 |
| Sample 10 | Chemical formula 15 | Magenta | 34.3 | 32 |
| | | cyan | 34 | 31.7 |
| Sample 11 | — | Magenta | 55.6 | 55.5 |
| | | cyan | 54 | 53.9 |
| Sample 12 | Chemical formula 17 | Magenta | 30.1 | 29 |
| | | cyan | 29.2 | 28.5 |
| Sample 13 | Chemical formula 18 | Magenta | 42.5 | 40.3 |
| | | cyan | 41.8 | 39.2 |
| Sample 14 | Chemical formula 19 | Magenta | 40 | 39 |
| | | cyan | 39.1 | 38 |
| Sample 15 | Chemical formula 20 | Magenta | 53 | 52.1 |
| | | cyan | 52.4 | 51.1 |
| Sample 16 | Chemical formula 21 | Magenta | 49.1 | 48 |
| | | cyan | 48.1 | 47 |

Here, the dynamic surface tension ($\sigma_{20}$) at 20 Hz and that ($\sigma_1$) at 1 Hz were measured, under measurement conditions of 25° C. atmosphere and a capillary diameter of 0.215 mm, using a bubble pressure dynamic surface tension meter (BP-2) manufactured by KRUSS.

It will be seen from measured results shown in Table 4 that, with samples 2 and 10, allowing for printing of further superior printing of higher optical density and lower in boundary bleeding and speckled color mixing in all-over printing, the dynamic surface tension ($\sigma_{20}$) and the dynamic surface tension ($\sigma_1$) of each of the magenta-based ink and the cyan-based ink are not less than 30 mN/m and not higher than 38 mN/m, respectively.

It may be seen from above that setting the dynamic surface tension at 20 Hz ($\sigma_{20}$) of the ink to 30 mN/m or higher and setting the dynamic surface tension at 1 Hz ($\sigma_1$) of the ink to 38 mN/m or lower, in preparing the ink, are crucial for preparing the ink allowing for high quality printing higher in optical density and which is suppressed in boundary bleeding and in speckled color mixing in all-over printing.

INDUSTRIAL APPLICABILITY

The recording liquid of the present invention suffers from bubbling to a lesser extent and superior in emission stability and, when the recording liquid is used for multi-color printing an image or a letter/character on a paper sheet of medium quality, the recording liquid is high in optical density and free from boundary bleeding or speckled color mixing in all-over printing, and hence the recording liquid of the present invention may be used for high-quality printing.

What is claimed is:

1. A recording liquid deposited on a support in the state of liquid droplets for recording thereon, comprising:
    a colorant material;

a solvent for dispersing said colorant material; and an ethylene oxide adduct of a dihydric alcohol, containing a hydrocarbon group with 9 or less carbon atoms and having a ratio I/O of an inorganic value (IV) to an organic value (OV) not less than 1 and not larger than 1.37.

2. The recording liquid according to claim 1, wherein said ethylene oxide adduct of a dihydric alcohol includes at least a branched hydrocarbon group.

3. The recording liquid according to claim 1, wherein said ethylene oxide adduct of a dihydric alcohol includes at least one or more of organic compounds represented by the chemical formulas 1 to 3:

[Chemical formula 1]

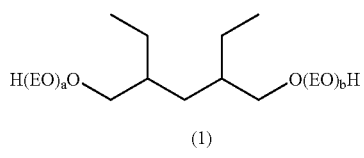

(1)

where $1 \leq a + b \leq 6$

[Chemical formula 2]

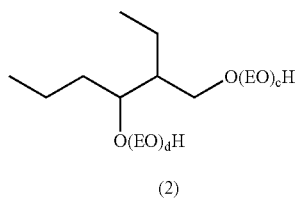

(2)

where $1 \leq c + d \leq 5$

[Chemical formula 3]

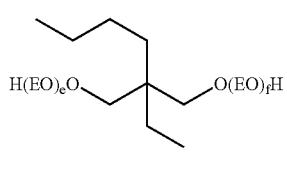

(3)

where $1 \leq e + f \leq 6$.

4. The recording liquid according to claim 1, wherein a dynamic surface tension ($\gamma_{20}$) at 20 Hz is not less than 30 mN/m and a dynamic surface tension ($\gamma_1$) at 1 Hz is not larger than 38 mN/m.

5. A liquid cartridge mounted to a liquid supply device for operating as a supply source of a recording liquid for said liquid supply device, said liquid supply device provided to a liquid emitting device adapted for emitting the recording liquid, held in a liquid vessel, in the form of liquid droplets, and depositing the emitted recording liquid on a support, for producing the recording, said recording liquid comprises:

a colorant material;

a solvent for dispersing said colorant material; and an ethylene oxide adduct of a dihydric alcohol, containing a hydrocarbon group with 9 or less carbon atoms and having a ratio I/O of an inorganic value (IV) to an organic value (OV) not less than 1 and not larger than 1.37.

6. The liquid cartridge according to claim 5, wherein said ethylene oxide adduct of a dihydric alcohol includes at least a branched hydrocarbon group.

7. The liquid cartridge according to claim 5, wherein said ethylene oxide adduct of a dihydric alcohol includes at least one or more of organic compounds represented by the chemical formulas 1 to 3:

[Chemical formula 1]

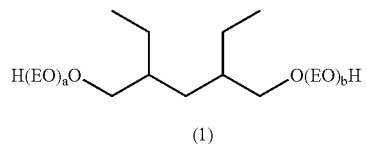

(1)

where $1 \leq a + b \leq 6$

[Chemical formula 2]

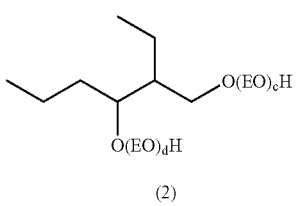

(2)

where $1 \leq c + d \leq 5$

[Chemical formula 3]

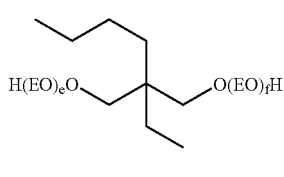

(3)

where $1 \leq e + f \leq 6$.

8. The recording liquid according to claim 5, wherein a dynamic surface tension ($\gamma_{20}$) at 20 Hz is not less than 30 mN/m and a dynamic surface tension ($\gamma_1$) at 1 Hz is not larger than 38 mN/m.

9. The liquid cartridge according to claim 5, wherein said liquid vessel includes:

a liquid reservoir for accommodating said recording liquid, a connecting part for connecting the liquid cartridge to the liquid supply device so that, when the liquid cartridge is connected to the liquid supply device, the recording liquid contained in said liquid reservoir may be supplied to said liquid supply device, a communication port for taking in outside air in an amount corresponding to a decreased amount of the recording liquid in said liquid reservoir when the liquid cartridge is mounted on the liquid supply device and said recording liquid is supplied from said liquid reservoir to said liquid supply device, an air inlet duct for establishing communication between said liquid reservoir and the communication port for introducing air taken in via said communication port into said liquid reservoir, and a storage arranged between said communication port and the air inlet duct for storing the recording liquid flowing out from said liquid reservoir.

10. A liquid emitting device comprising:

an emitting unit including a liquid chamber for storing a recording liquid, a supply part for supplying said recording liquid to said liquid chamber, one or more pressure generating element(s) provided to said liquid chamber for thrusting said recording liquid stored in said liquid chamber, and an emitting opening for emitting said recording liquid, thrust by said pressure generating element, onto a surface of a support from said liquid chamber as a liquid droplet; and a liquid cartridge connected to said emitting unit for operating as a supply source for said recording liquid, wherein, said recording liquid comprises a colorant material, a solvent for dispersing said colorant material and an ethylene oxide adduct of a dihydric alcohol, containing a hydrocarbon group with 9 or less carbon atoms and having a ratio I/O of an inorganic value (IV) to an organic value (OV) not less than 1 and not larger than 1.37.

11. The liquid emitting device according to claim 10, wherein said ethylene oxide adduct of a dihydric alcohol includes at least a branched hydrocarbon group.

12. The liquid emitting device according to claim 10, wherein said ethylene oxide adduct of a dihydric alcohol in said recording liquid includes at least one or more of organic compounds represented by the chemical formulas 1 to 3:

[Chemical formula 1]

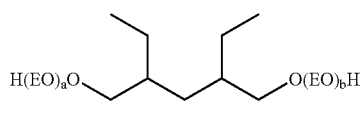

(1)

where $1 \leq a + b \leq 6$

[Chemical formula 2]

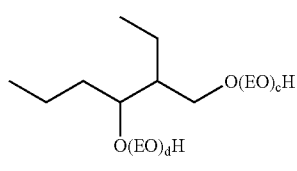

(2)

where $1 \leq c + d \leq 5$

[Chemical formula 3]

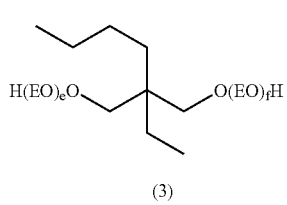

(3)

where $1 \leq e + f \leq 6$.

13. The liquid emission device according to claim 10, wherein the recording liquid has a dynamic surface tension ($\gamma_{20}$) at 20 Hz not less than 30 mN/m and a dynamic surface tension ($\gamma_1$) at 1 Hz not larger than 38 mN/m.

14. The liquid emission device according to claim 10, wherein said emitting openings of said emission unit are juxtaposed along a line.

15. A liquid emitting method employing a liquid emitting device comprising:

an emitting unit including a liquid chamber for storing a recording liquid, a supply part for supplying said recording liquid to said liquid chamber, one or more pressure generating elements provided to said liquid chamber for thrusting said recording liquid stored in said liquid chamber, and one or more emitting openings for emitting said recording liquid, thrust by said one or more pressure generating elements, onto a surface of a support from said liquid chamber as liquid droplets; and a liquid cartridge connected to said emitting unit for operating as a supply source for said recording liquid, wherein, said recording liquid comprises a colorant material, a solvent for dispersing said colorant material and an ethylene oxide adduct of a dihydric alcohol, containing a hydrocarbon group with 9 or less carbon atoms and having a ratio I/O of an inorganic value (IV) to an organic value (OV) not less than 1 and not larger than 1.37.

16. The liquid emitting method according to claim 15, wherein said ethylene oxide adduct of a dihydric alcohol in said recording liquid includes at least a branched hydrocarbon group.

17. The liquid emitting method according to claim 15, wherein at least one or more of organic compounds are represented by the chemical formulas 1 to 3:

[Chemical formula 1]

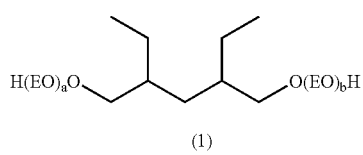

(1)

where $1 \leq a + b \leq 6$

[Chemical formula 2]

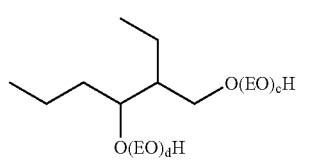

(2)

where $1 \leq c + d \leq 5$

[Chemical formula 3]

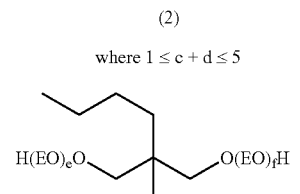

(3)

where $1 \leq e + f \leq 6$ is used as said ethylene oxideadduct of the dihydric alcohol in said recording liquid.

18. The liquid emission method according to claim 15, wherein the recording liquid has a dynamic surface tension ($\gamma_{20}$) at 20 Hz not less than 30 mN/m and a dynamic surface tension ($\gamma_1$) at 1 Hz not larger than 38 mN/m.

19. The liquid emission method according to claim 15, wherein said one or more emitting openings of said emission unit are juxtaposed along a line.

* * * * *